United States Patent
Benjebbour et al.

(10) Patent No.: US 10,779,280 B2
(45) Date of Patent: Sep. 15, 2020

(54) COMMUNICATION CONTROL METHOD, RADIO COMMUNICATION SYSTEM, SMALL BASE STATION, AND USER APPARATUS

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 277 days.

(21) Appl. No.: 15/504,448

(22) PCT Filed: Jun. 2, 2015

(86) PCT No.: PCT/JP2015/065956
§ 371 (c)(1),
(2) Date: Feb. 16, 2017

(87) PCT Pub. No.: WO2016/027548
PCT Pub. Date: Feb. 25, 2016

(65) Prior Publication Data
US 2017/0238297 A1    Aug. 17, 2017

(30) Foreign Application Priority Data
Aug. 22, 2014   (JP) .................................. 2014-169894

(51) Int. Cl.
*H04W 72/04* (2009.01)
*H04B 7/0417* (2017.01)
(Continued)

(52) U.S. Cl.
CPC ........ *H04W 72/046* (2013.01); *H04B 7/0404* (2013.01); *H04B 7/0417* (2013.01);
(Continued)

(58) Field of Classification Search
USPC ........................................................ 370/329
See application file for complete search history.

(56) References Cited

U.S. PATENT DOCUMENTS

2009/0322613 A1* 12/2009 Bala .................... H04B 7/0617
                                                              342/373
2012/0176939 A1*  7/2012 Qu ........................ H04L 5/0023
                                                              370/255
(Continued)

FOREIGN PATENT DOCUMENTS

JP    2013-232741 A    11/2013
WO    2011/063015 A2    5/2011
(Continued)

OTHER PUBLICATIONS

Extended European Search Report issued in corresponding European Patent Application No. 15833645.3, dated Jul. 31, 2017 (9 pages).
(Continued)

*Primary Examiner* — Gregory B Sefcheck
*Assistant Examiner* — Majid Esmaeilian
(74) *Attorney, Agent, or Firm* — Osha Liang LLP

(57) ABSTRACT

A small base station executes radio communication using multiple antennas. There are set multiple antenna groups that each include all or a portion of the antennas and multiple antenna group patterns that each include at least one of the antenna groups. The small base station transmits reference signals with sequences that differ from one another between antenna groups that are included in the same antenna group pattern. A user apparatus receives the reference signals. Based on a reception result of the reference signals, a use antenna group pattern and at least one use antenna group that are to be used for transmission of a radio signal from the small base station are determined.

10 Claims, 14 Drawing Sheets

(51) Int. Cl.
   *H04L 5/00*       (2006.01)
   *H04W 48/12*      (2009.01)
   *H04B 7/06*       (2006.01)
   *H04B 7/0404*     (2017.01)
   *H04W 72/08*      (2009.01)

(52) U.S. Cl.
   CPC ......... *H04B 7/0617* (2013.01); *H04B 7/0684* (2013.01); *H04B 7/0691* (2013.01); *H04L 5/005* (2013.01); *H04W 48/12* (2013.01); *H04W 72/0413* (2013.01); *H04W 72/085* (2013.01); *H04B 7/0632* (2013.01); *H04W 72/048* (2013.01)

(56) References Cited

U.S. PATENT DOCUMENTS

2012/0314665 A1* 12/2012 Ishida ................ H01Q 1/246
                                                          370/329
2014/0192768 A1*  7/2014 Yeh ................... H04B 7/0469
                                                          370/330
2015/0230213 A1*  8/2015 Kim ................... H04L 27/2626
                                                          370/329
2015/0244509 A1*  8/2015 Lee ..................... H04L 5/0023
                                                          370/336
2016/0173176 A1*  6/2016 Mizusawa ............ H04B 7/0456
                                                          375/267

FOREIGN PATENT DOCUMENTS

WO    2013/032188 A2    3/2013
WO    2013/109041 A1    7/2013

OTHER PUBLICATIONS

International Search Report issued in corresponding application No. PCT/JP2015/065956 dated Jul. 7, 2015 (2 pages).
Office Action issued in the counterpart European Patent Application No. 15833645.3, dated Dec. 13, 2018 (8 pages).
Office Action issued in the counterpart Japanese Patent Application No. 2016543848, dated Nov. 27, 2018 (6 pages).

* cited by examiner

| FREQUENCY | 2.5 GHz | 3.5 GHz | 5 GHz | 10 GHz | 20 GHz |
|---|---|---|---|---|---|
| NUMBER OF ANTENNAS $N_T$ | 1x | 2x | 4x | 16x | 64x |
| BEAMFORMING GAIN (dB) | 0 dB | 3 dB | 6 dB | 12 dB | 18 dB |

COMMUNICATION CONTROL METHOD, RADIO COMMUNICATION SYSTEM, SMALL BASE STATION, AND USER APPARATUS

TECHNICAL FIELD

The present invention relates to a communication control method, a radio communication system, a small base station, and a user apparatus.

BACKGROUND ART

In recent years, in the field of radio communication, a MIMO (Multiple-Input and Multiple-Output) transmission scheme has been utilized, which realizes an improvement in the speed and quality of signal transmission by executing transmission and reception using multiple antennas on each of the transmitter side and the receiver side.

Moreover, in order to further improve signal transmission speed and further reduce interference, a massive MIMO transmission scheme has been considered, which uses a mass of antenna elements (e.g., 100 elements or more) in a high frequency band (e.g., 10 GHz or more) that enables antenna miniaturization and in which a wide bandwidth can be secured (e.g., Patent Document 1).

In massive MIMO, advanced beamforming (BF) is executed that uses a larger number of antenna elements in comparison to conventional MIMO. Beamforming is a technology that involves controlling of characteristics, such as the directivity, shape, or gain, of a beam (e.g., a transmission beam corresponding to a transmitting antenna, a reception beam corresponding to a receiving antenna) by controlling antenna elements. With MIMO, the phase and the amplitude can be controlled for each antenna element, and therefore, the flexibility of beam control increases with an increase in the number of antenna elements that are used.

RELATED ART DOCUMENT

Patent Document

Patent Document 1: Japanese Patent Application Laid-Open Publication No. 2013-232741

SUMMARY OF THE INVENTION

Problem to be Solved by the Invention

Controlling a large number of antenna elements individually comes with difficulties. In order to control each antenna element individually, elements such as an amplifier, a D/A converter and an A/D converter need to be provided for every antenna element, thus resulting in complication of the circuit configuration and an increase in the processing load. Furthermore, the amount of channel information will increase that is fed back from a user apparatus to a base station (small base station or macro base station) for controlling each antenna element. On the other hand, in a case where all the antenna elements are controlled collectively, the circuit configuration and control processing will be simplified, but multi-beam (multi-stream) multiplexing, which is an advantageous technical feature of MIMO, will no longer be possible.

In consideration of the above situation, an object of the present invention is to enable multi-beam multiplexing in massive MIMO transmission by appropriately controlling multiple antennas, while suppressing the amount of information that is fed back.

Means of Solving the Problems

A communication control method of the present invention is a communication control method for a small base station and a user apparatus to perform radio communication with each other, the small base station performing radio communication with the user apparatus using multiple antennas, wherein there are set multiple antenna groups that each include all or a portion of the antennas and multiple antenna group patterns that each include at least one of the antenna groups. The method includes: transmitting, from the small base station, reference signals with sequences that differ from one another between antenna groups that are included in a same antenna group pattern; receiving the reference signals in the user apparatus; and determining, based on a reception result of the reference signals, a use antenna group pattern and at least one use antenna group that are to be used for transmission of a radio signal from the small base station, the use antenna group pattern being determined from among the multiple antenna group patterns, the at least one use antenna group being determined from among the multiple antenna groups.

A radio communication system of the present invention includes: a user apparatus; and a small base station that has multiple antennas. There are set multiple antenna groups that each include all or a portion of the antennas and multiple antenna group patterns that each include at least one of the antenna groups. The small base station includes: a reference signal transmitter configured to transmit reference signals with sequences that differ from one another between antenna groups that are included in a same antenna group pattern. The user apparatus includes: a reference signal receiver configured to receive the reference signals transmitted from the small base station. The radio communication system further includes: an antenna controller configured to determine, based on a reception result of the reference signals, a use antenna group pattern and at least one use antenna group that are to be used for transmission of a radio signal from the small base station, the use antenna group pattern being determined from among the multiple antenna group patterns, the at least one use antenna group being determined from among the multiple antenna groups.

A small base station of the present invention includes multiple antennas. There are set multiple antenna groups that each include all or a portion of the antennas and multiple antenna group patterns that each include at least one of the antenna groups. The small base station further includes: a reference signal transmitter configured to transmit, to a user apparatus, reference signals with sequences that differ from one another between antenna groups that are included in a same antenna group pattern; and a specific signal transmitter configured to transmit user-specific data using a use antenna group pattern and at least one use antenna group that are determined based on a reception result of the reference signals in the user apparatus, the use antenna group pattern being determined from among the multiple antenna group patterns, the at least one use antenna group being determined from among the multiple antenna groups.

A user apparatus of the present invention includes a radio communicator configured to perform radio communication with a small base station that has multiple antennas. There are set multiple antenna groups that each include all or a portion of the antennas and multiple antenna group patterns that each include at least one of the antenna groups. The user apparatus further includes: a reference signal receiver configured to receive reference signals that are transmitted from the small base station, the reference signals having sequences that differ from one another between antenna groups that are included in a same antenna group pattern; and an antenna controller configured to determine, based on a reception result of the reference signals, a use antenna group pattern and at least one use antenna group that are to be used for transmission of a radio signal from the small base station, the use antenna group pattern being determined from among the multiple antenna group patterns, the at least one use antenna group being determined from among the multiple antenna groups.

Effect of the Invention

According to the present invention, in massive MIMO transmission, multiple antennas are appropriately controlled in units of antenna groups, thereby enabling multi-beam multiplexing while suppressing the amount of information that is fed back.

MODES FOR CARRYING OUT THE INVENTION 1-1. Outline of Radio Communication System

Figure 1:
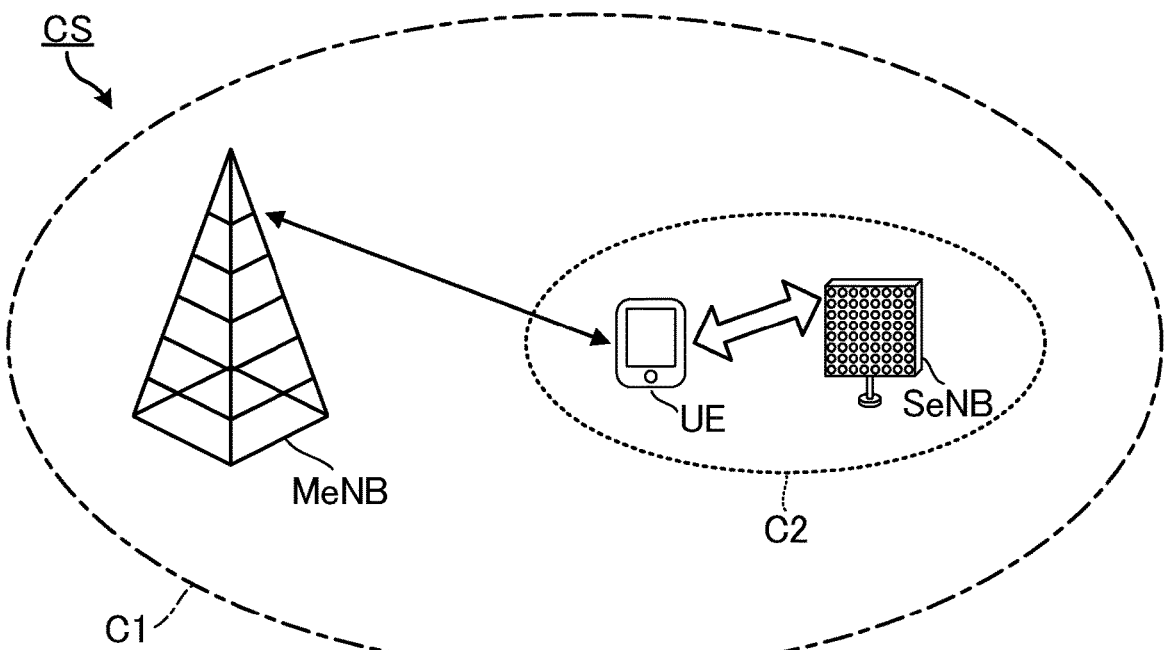
FIG. 1 is a schematic view of a radio communication system according to an embodiment.

FIG. 1 is a schematic view showing a radio communication system CS according to a first embodiment of the present invention. The radio communication system CS includes a macro base station MeNB, a small base station SeNB, and a user apparatus UE. The macro base station MeNB and the small base station SeNB may be collectively referred to as "base stations eNB". The macro base station MeNB and the small base station SeNB are connected to each other by an interface, such as optical fiber. The macro base station MeNB forms a macro cell C1 therearound, and the small base station SeNB forms a small cell C2 therearound. As shown in FIG. 1, the macro cell C1 and the small cell C2 can overlap.

Each element in the radio communication system CS executes communication in accordance with a predetermined access technology, such as the LTE/SAE (Long Term Evolution/System Architecture Evolution) standards included in the 3GPP (Third Generation Partnership Project) standards, for example. Any suitable scheme may be employed for radio communication between the user apparatus UE and each of the base stations (MeNB and SeNB). For example, OFDMA (Orthogonal Frequency Division Multiple Access) is employed for the downlink, and SC-FDMA (Single-Carrier Frequency Division Multiple Access) is employed for the uplink. The radio communication scheme that is used by the macro base station MeNB may differ from the radio communication scheme that is used by the small base station SeNB.

1-2. Relationship between Base Station (Cell) and Frequency Band

Figure 2:
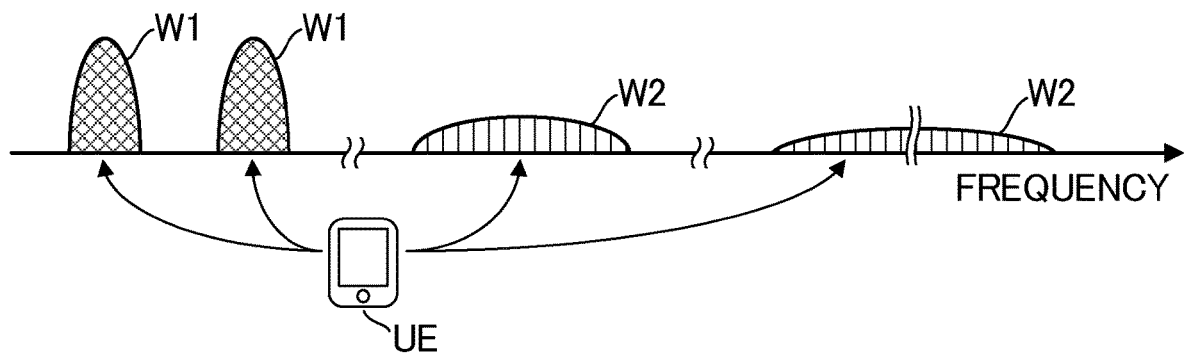
FIG. 2 is a diagram illustrating frequency bands for carriers used in the radio communication system.

As shown in FIG. 2, the macro base station MeNB executes radio communication using carriers W1 in comparatively low frequency bands (e.g., existing 800 MHz band or 2 GHz band), and the small base station SeNB executes radio communication using carriers W2 in comparatively high frequency bands (e.g., 3 GHz band or 10 GHz band). Because the propagation loss (path-loss) PL of radio signals increases as the frequency f becomes higher, the small cell C2 formed by the small base station SeNB is smaller in area than the macro cell C1 formed by the macro base station MeNB. The approximate relationship between the propagation loss PL and the frequency f is shown with the following equation.

$$PL = 20 \log_{10}(f)$$

The macro cell C1 and the small cell C2 are preferably used for different purposes according to the above frequency characteristics. That is, mobility support for the user apparatus UE and securing of radio communication coverage are preferably realized by the macro cell C1 in which the carriers W1 are used, the carriers W1 being in low frequency bands in which transmission power density is high and which allow for a wide range of access. Traffic offload and an increase in cell capacity are preferably realized by the small cell C2 in which the carriers W2 are used, the carriers W2 being in high frequency bands in which a wide bandwidth is easily secured and a high data rate can be realized.

1-3. Beamforming Gain with Massive MIMO

In the present embodiment, a massive MIMO transmission scheme using a large number of antennas A is employed in the small cell C2 (small base station SeNB) in which the carriers W2 in the high frequency bands are used. Massive MIMO is also referred to as 3D/massive MIMO. The aforementioned large propagation loss PL in the carriers W2 in the high frequency bands is compensated by a beamforming gain that is obtained by massive MIMO, as described below.

Figure 3:
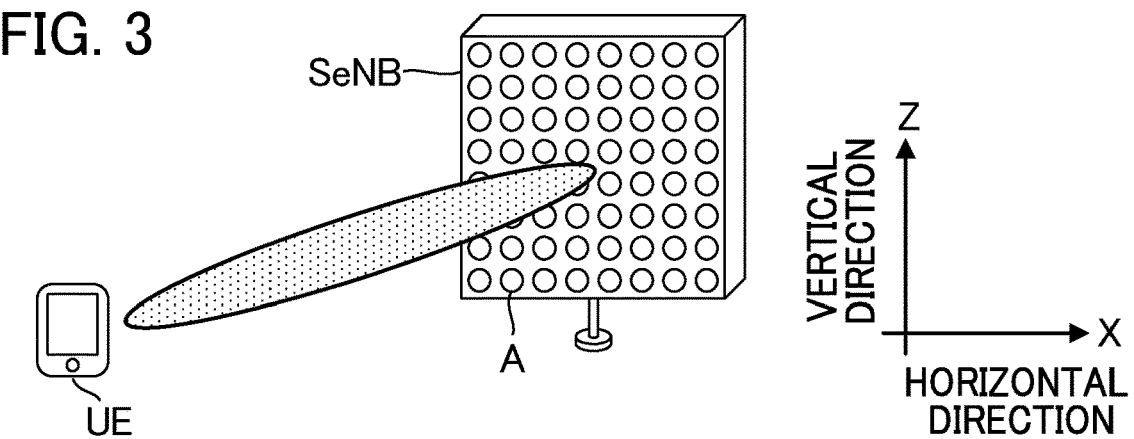
FIG. 3 is a diagram showing an exemplary disposition of antennas in massive MIMO.

As shown in FIG. 3, in the massive MIMO of the present embodiment, the antennas A of the small base station SeNB are disposed two-dimensionally. In a case where the same number of antennas A are disposed in the horizontal direction (X-axis direction) and in the vertical direction (Z-axis direction), theoretically, the number of antennas A that are disposed increases in proportion to a squared value of the frequency f used in radio communication. This is because the number of antennas A that are disposed on any given line segment increases in proportion to the frequency f, as will be described later. The antennas A may be disposed in any suitable manner. For example, the number of antennas A disposed in the horizontal direction may be different from that in the vertical direction, or the antennas A may be disposed three-dimensionally.

Figure 4:
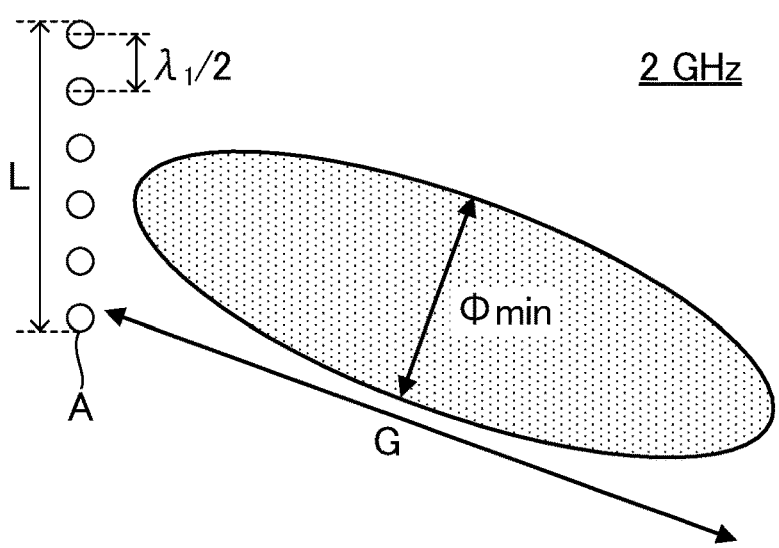
FIG. 4 is a diagram illustrating the relationship between a frequency in use and the number of antennas that can be disposed.
Figure 5:
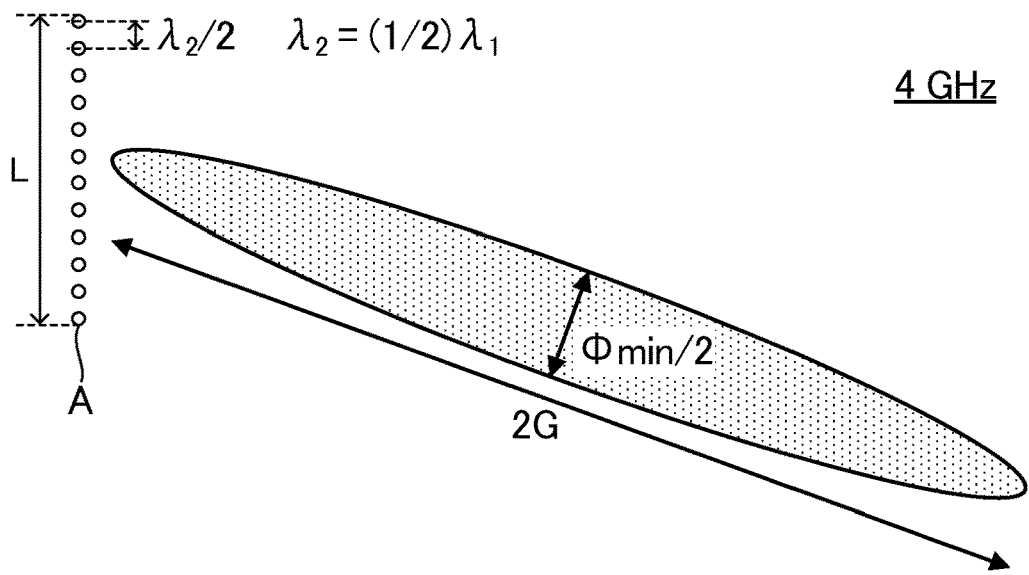
FIG. 5 is a diagram illustrating the relationship between a frequency in use and the number of antennas that can be disposed.

With reference to FIGS. 4 and 5, the relationship between the frequency f and the number of antennas $N_T$ that can be disposed within a predetermined interval will be described in detail. The description given below is based on a configuration in which the antennas A are disposed one-dimensionally (on one straight line). It should be understood that, in a case where the antennas A are disposed two-dimensionally, the following description is applicable to each of the axes (in the horizontal direction and in the vertical direction).

FIG. 4 is a diagram showing the disposition of the antennas A in a case where the frequency f ($f_1$) is 2 GHz. FIG. 5 is a diagram showing the disposition of the antennas A in a case where the frequency f ($f_2$) is 4 GHz. In FIGS. 4 and 5, the antennas A are disposed within a predetermined antenna length L. A minimum distance ML between the antennas A is generally shown by the following equation (1).

$ML=\lambda/2$ (where $\lambda$ is the wavelength of radio waves that are transmitted from the antennas $A$)   Equation (1)

The wavelength $\lambda$, is generally shown by the following equation (2).

$\lambda=c/f$ (where $c$ is the speed of light)   Equation (2)

Since the frequency $f_1$ in FIG. 4 and the frequency $f_2$ in FIG. 5 are in the relationship shown in equation (3), from equation (2), the wavelength $\lambda_1$ in FIG. 4 and the wavelength $\lambda_2$ in FIG. 5 are in the relationship shown in equation (4).

$f_2=2f_1$   Equation (3)

$\lambda_2=(1/2)\lambda_1$   Equation (4)

Accordingly, the minimum distance $ML_2$ between the antennas A at the frequency $f_2$ is a half of the minimum distance $ML_1$ at the frequency $f_1$ ($ML_2=(1/2)ML_1$). That is, when the frequency f doubles, the number of antennas $N_T$ that can be disposed within the predetermined antenna length L doubles. In FIG. 4, six pieces of antennas A are disposed within the antenna length L, and in FIG. 5, 12 pieces (=6 pieces×2) of antennas A are disposed. The above relationship can obviously be generalized. That is, when the frequency f increases n times, the number of antennas $N_T$ that can be disposed within the predetermined antenna length L increases n times.

When the number of antennas $N_T$ increases, the minimum beam width $\Phi_{min}$ decreases and a beamforming gain G increases. In a case where the antennas A are disposed one-dimensionally, when the number of antennas $N_T$ increases n times, the minimum beam width $\Phi_{min}$ decreases (1/n) times and the beamforming gain G increases n times, as shown in FIGS. 4 and 5.

Figures 6, 7:
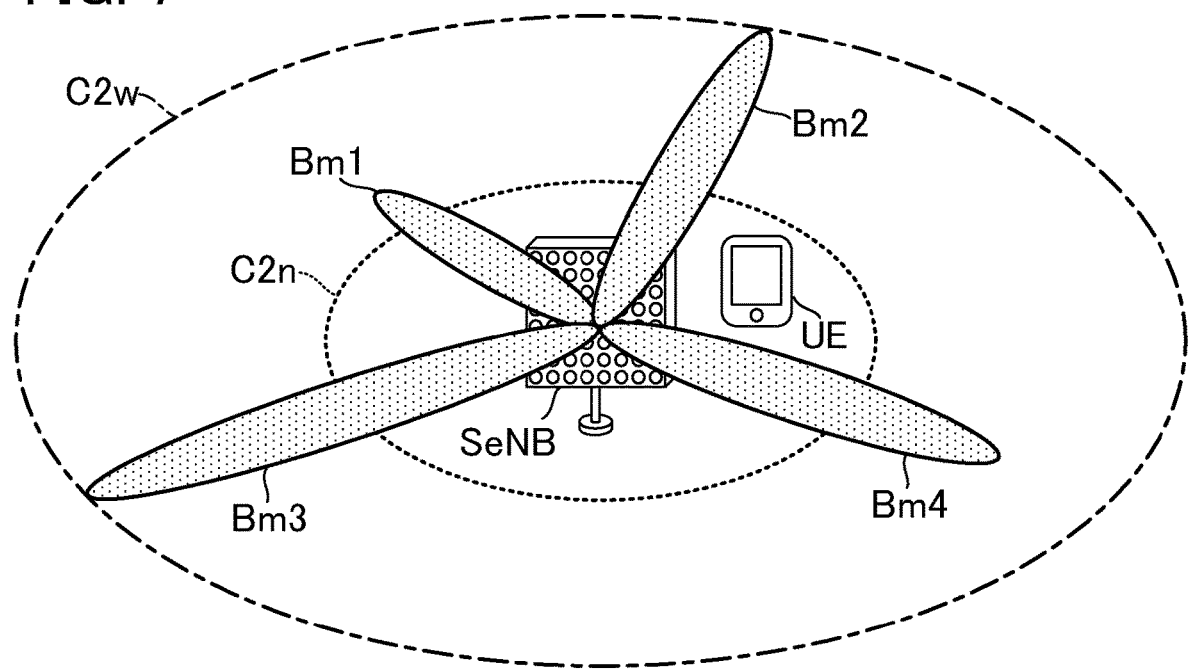
FIG. 6 is a table showing the relationship between the frequency, the number of antennas, and the beamforming gain.
FIG. 7 is a diagram illustrating the difference in small cell coverage resulting from the availability of beamforming.

FIG. 6 schematically shows the relationship between the frequency f, the number of antennas $N_T$, and the beamforming gain G in a case where the antennas A are disposed two-dimensionally. As described above, given that the number of antennas $N_T$ increases n times when the frequency f increases n times in a case where the antennas A are disposed one-dimensionally, in a case where the antennas A are disposed two-dimensionally, the number of antennas $N_T$ will increase $n^2$ times when the frequency f increases n times. In FIG. 6, the number of antennas $N_T$ at 2.5 GHz serves as a reference (one times (1×)). When the frequency f changes from 2.5 GHz to 3.5 GHz (increases 3.5/2.5=1.4 times), the number of antennas $N_T$ increases approximately two times (2×; $1.4^2$=1.96≈2). Also, when the frequency f changes from 2.5 GHz to 5 GHz (increases 5/2.5=2 times), the number of antennas $N_T$ increases four times (4×; $2^2$=4). Similarly, when the frequency f changes from 2.5 GHz to 10 GHz (increases four times) and from 2.5 GHz to 20 GHz (increases eight times), the number of antennas $N_T$ respectively increases 16 times (16×; $4^2$=16) and 64 times (64×; $8^2$=64). As the number of antennas $N_T$ increases, the beamforming gain G also increases as shown in FIG. 6. As described above, in the massive MIMO of the present embodiment, the higher the frequency f that is used, the larger the beamforming gain G that is obtained.

As described above, in the massive MIMO transmission scheme of the present embodiment, the beamforming gain G is increased by use of a large number of antennas A. Furthermore, the higher the frequency f that is used, the larger the beamforming gain G that is obtained. Accordingly, the high propagation loss PL in the high frequency bands is compensated by the beamforming gain G.

1-4. Transmission of Reference Signal in Small Cell

It may not always be possible for the small base station SeNB to execute beamforming when transmitting radio signals. In order to execute beamforming, it is necessary to give a weight to each of the antennas A included in the small base station SeNB to transmit radio signals, the weight being given based on channel state information (CSI) that is obtained by feedback from the user apparatus UE and based on information such as the angle of departure (AOD) and the angle of arrival (AOA). Accordingly, in a period during which feedback information, such as channel state information, from the user apparatus UE cannot be used, the small base station SeNB is unable to execute beamforming. As a result, in the above period, the beamforming gain G cannot be obtained, and consequently, the small base station SeNB cannot have sufficient coverage.

With reference to FIG. 7, the difference in the coverage of the small cell C2 will be described, the difference resulting from whether beamforming can be executed. In a case where beamforming is executable, it is possible for the small base station SeNB to orient transmission beams Bm (Bm1, Bm2, . . . ) to various directions. As a result, it is possible for the small base station SeNB to obtain a wide coverage C2w that combines regions that are covered by the transmission beams Bm that can be formed. On the other hand, in a case where beamforming is not executable, the small base station SeNB will obtain a narrow coverage C2n that is a region within which radio signals can be transmitted without beamforming (i.e., without the beamforming gain G).

When beamforming is being executed, radio signals from the small base station SeNB are weakened for regions other than those in the directions to which the transmission beams Bm are oriented. That is, the small base station SeNB is not able to transmit radio signals to all the regions within the wide coverage C2w at the same given time. The above circumstance is particularly problematic when the small base station SeNB transmits a radio signal that is supposed to be received in common by multiple user apparatuses UE (e.g., a reference signal for received quality (RSRQ) and/or received power (RSRP) measurement). For example, there is a possibility that user apparatuses UE that are located in directions to which the transmission beams Bm are not oriented will not be able to receive reference signals with sufficient received quality, even when these user apparatuses UE are located within the narrow coverage C2n.

Figure 8:
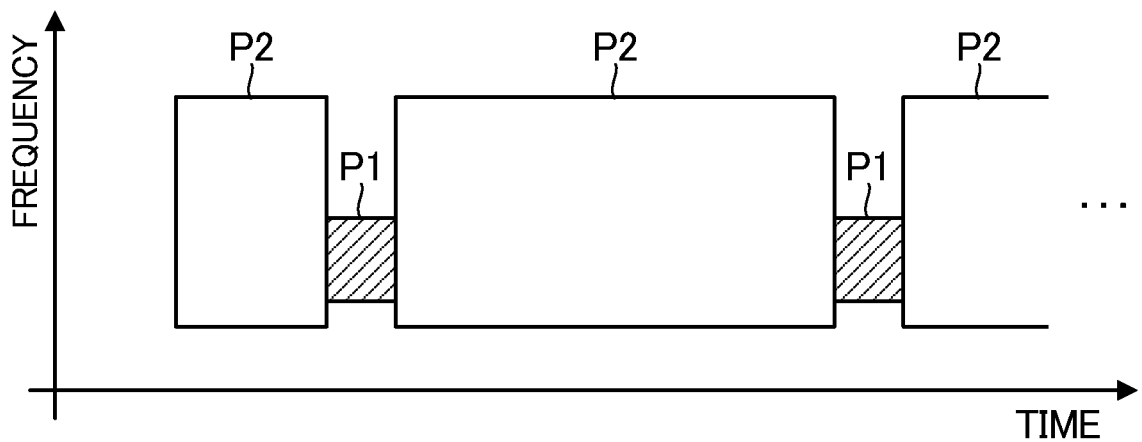
FIG. 8 is a diagram illustrating a boost in transmission power for a reference signal.

In order to resolve the above circumstance, as shown in FIG. 8, in sections P1 (frequency band and time slot) in which beamforming is not executed, the small base station SeNB of the present embodiment limits the transmission frequency bandwidth and boosts the transmission power to transmit the reference signals. In sections P2, the small base station SeNB executes beamforming to transmit user-specific signals (control messages and user-specific data). In the sections P2, a power boost such as that executed in the sections P1 is not executed.

By the boost in the transmission power for the reference signals as described above, the coverage of the small cell C2 widens with regard to the reference signals. As a result, the possibility increases for the user apparatuses UE to connect to the small cell C2 in which the beamforming gain G is high and a wide bandwidth can be obtained.

Preferably, the transmission power for the reference signals is boosted in the sections P1 such that a gain is obtained that is equal to the beamforming gain G that will be obtained when beamforming is executed. In this case, the coverage of the reference signals will equal the wide coverage C2w, which is obtained in a case where beamforming is executable. The boost in the transmission power as described above is not always essential. For example, a typical beam search may be performed also with regard to the reference signals.

1-5. Massive MIMO Antenna Control

Figure 9:
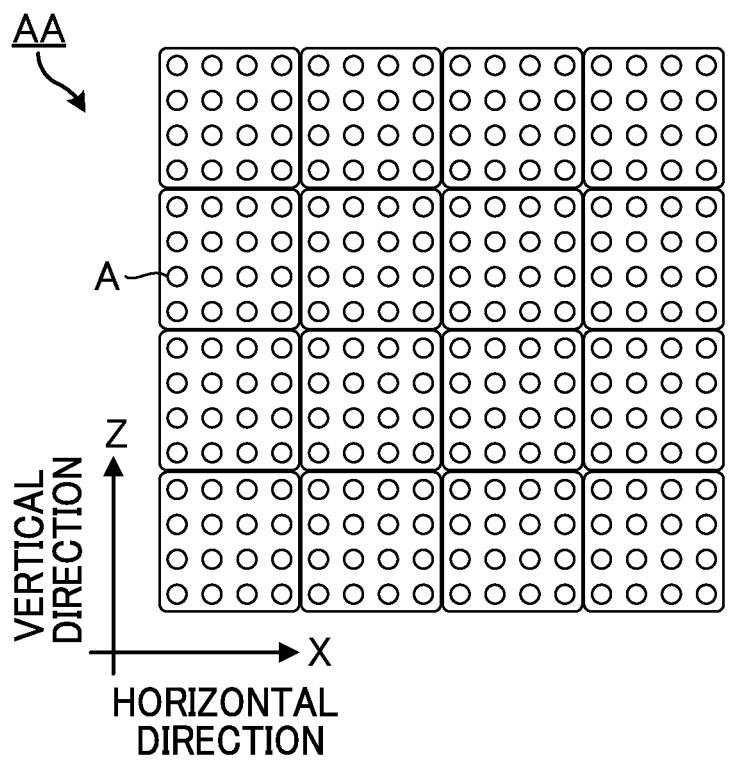
FIG. 9 is a schematic diagram of a massive MIMO antenna apparatus.

FIG. 9 is a schematic diagram of a massive MIMO antenna apparatus AA that has multiple antennas A. As shown in FIG. 9, the antenna apparatus AA with which the small base station SeNB is provided has a total of 256 antennas A, composed of 16 rows of antennas A in a horizontal direction and 16 columns of antennas A in a vertical direction. It is difficult to independently control each of the mass of antennas A that are included in the antenna apparatus AA. This is because, in order to control each antenna A independently, it is necessary to provide each antenna A with elements such as an amplifier, a D/A converter and an λ/D converter, and consequently, the circuit configuration will be complicated and the processing load will increase. On the other hand, if all the antennas A are collectively controlled, the circuit configuration and control processing will be simplified, but stream multiplexing with MIMO will no longer be possible. In view of this, in the present embodiment, simplification of control and multi-beam (multi-stream) multiplexing are together realized by controlling the antennas A in groups.

Figure 10:
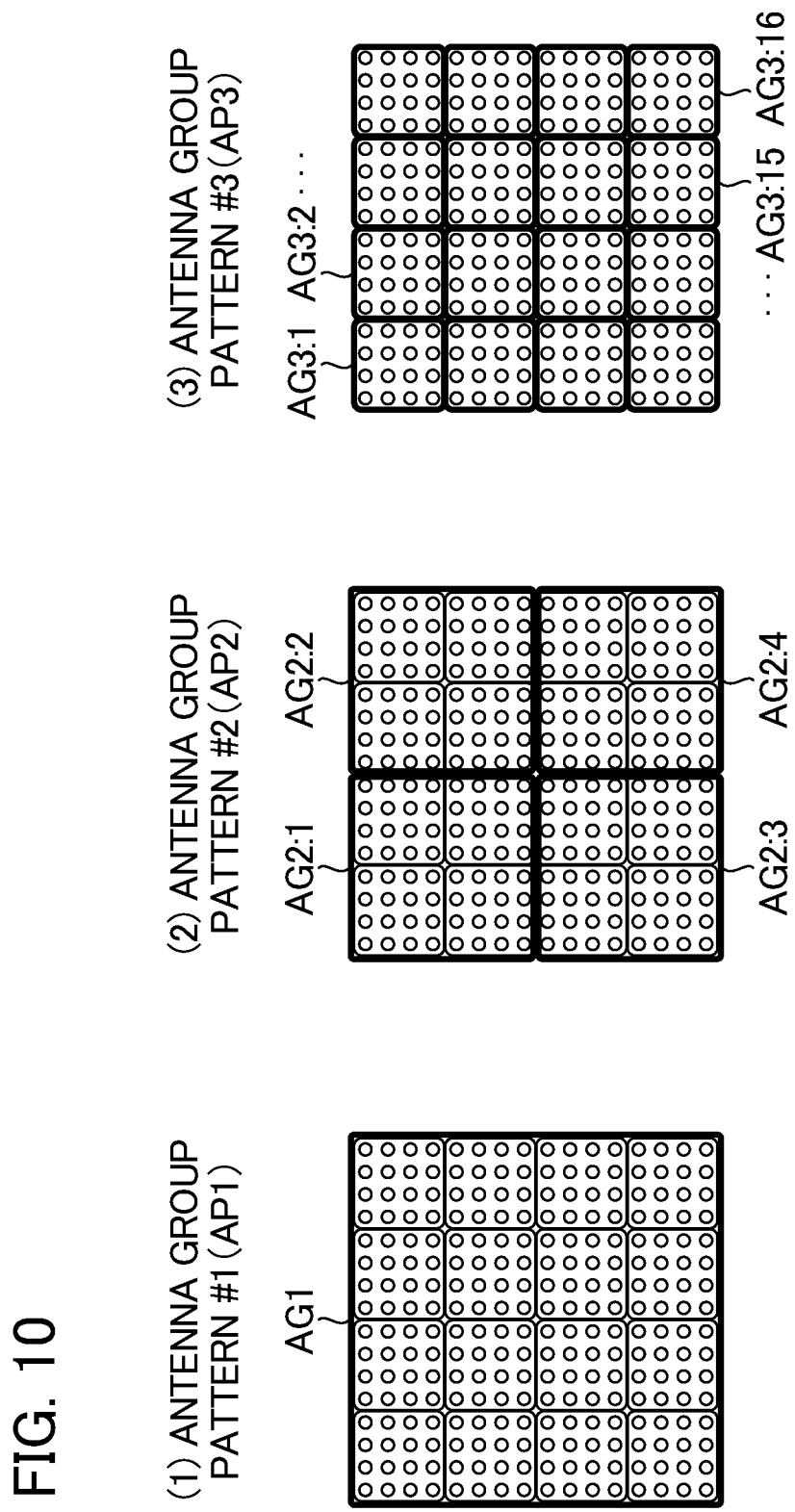
FIG. 10 is a diagram illustrating antenna group patterns and antenna groups.

With reference to FIG. 10, antenna group patterns AP and antenna groups AG, which together form units of control in the present embodiment, will be described. There are set multiple antenna group patterns AP in the small base station SeNB. Each antenna group pattern AP includes at least one antenna group AG Each antenna group AG includes at least two antennas A. Each antenna A belongs to any one of the at least one antenna group AG belonging to any one of the antenna group patterns AP. The number of antennas A that are included in an antenna group AG in the n-th antenna group pattern AP is preferably smaller than the number of antennas A that are included in an antenna group AG in the (n−1)-th antenna group pattern AP.

In the example shown in FIG. 10, an antenna group pattern AP1 includes one antenna group AG1, an antenna group pattern AP2 includes four antenna groups AG2 (AG2:1, . . . , AG2:4), and an antenna group pattern AP3 includes 16 antenna groups AG3 (AG3:1, . . . , AG3:16). The antenna group AG1 includes all the antennas A (256 pieces), the antenna groups AG2 each include 64 pieces of antennas A, and the antenna groups AG3 each include 16 pieces of antennas A.

In phase control of the present embodiment, hybrid analog/digital beamforming is preferably applied in which analog phase control is performed within an antenna group AG and digital phase control is performed between antenna groups AG.

Figure 11:
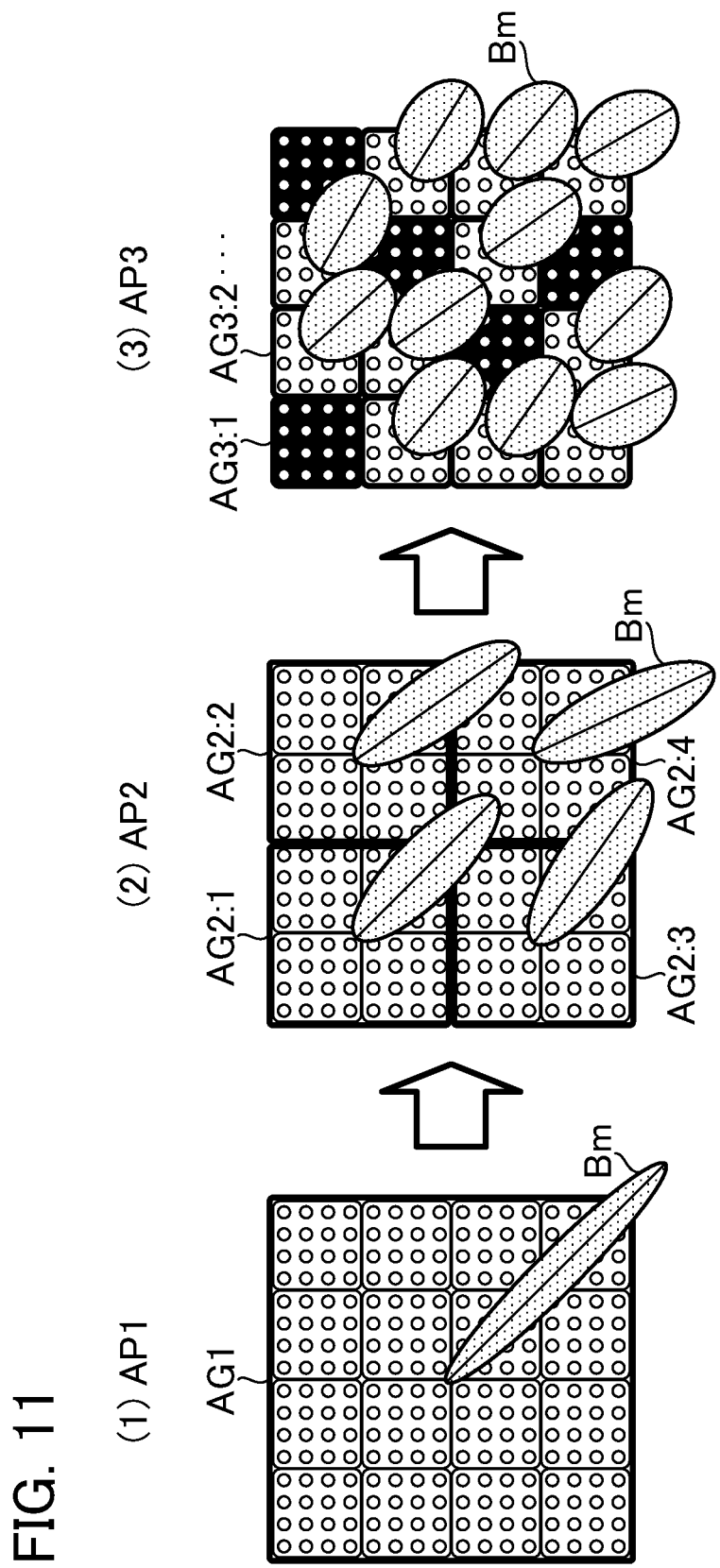
FIG. 11 is a schematic diagram illustrating massive MIMO antenna control.

With reference to FIG. 11, an overview of massive MIMO antenna control of the present embodiment will be described. In the present embodiment, a transmission beam Bm is formed for each antenna group AG The directivity (angle of transmission) of the transmission beam Bm is searched for and determined for each antenna group pattern AP. As shown in FIG. 11, the beam directivity search is executed in a stepwise manner. The directivity search is first performed for the antenna group pattern AP1, which has the lowest degree of stream multiplexing (i.e., which includes the fewest antenna groups AG). The search then proceeds to be performed stepwise for the antenna group pattern AP2 and then for the antenna group pattern AP3, the antenna group patterns AP2 and AP3 each having a higher degree of stream multiplexing than the antenna group pattern AP1 does. When described from the viewpoint of the antenna groups AG, the directivity search is first performed for the largest antenna group AG1, and then the search proceeds to be performed stepwise for the smaller antenna groups AG2 and AG3.

Performing the beam directivity search means determining, for any given antenna group AG, an angle D ($\varphi$ and $\theta$) of a transmission beam with which a high throughput is realizable (preferably, with which the highest throughput is realizable). The $\varphi$ indicates an angle of the transmission beam in the horizontal direction (X-axis direction), and the $\theta$ indicates an angle of the transmission beam in the vertical direction (Z-axis direction). Beam directivity searches for antenna groups AG that belong to the same antenna group pattern AP are preferably performed in parallel.

Also, the result (transmission beam angle D) of the beam directivity search in the prior step (e.g., AP1) is preferably used as a reference (search focus) when a beam directivity search is performed in the following step (e.g., AP2). For example, the transmission beam angle D ($\varphi$ and $\theta$) resulting from the search performed in the prior step is preferably used in the beamforming of a reference signal that is to be transmitted from the small base station SeNB in the following step. There is a high possibility that the transmission beam angle D that is appropriate for a given user apparatus UE will not vary greatly from one step to the next (i.e., will not vary greatly even when the size of the antenna groups AG changes). Therefore, the search for the transmission beam angle D can be performed with great efficiency according to the above configuration.

After beam directivity searches are executed for every antenna group pattern AP, the antenna group pattern AP with which a high throughput is realizable (preferably, with which the highest throughput is realizable) is selected and is used for operations (precoding, etc.) for the small base station SeNB to transmit radio signals.

As described above, for an antenna group pattern AP that includes multiple antenna groups AG, the transmission beam angle D ($\varphi$ and $\theta$) and, consequently, the transmission weight w($\varphi$, $\theta$) is determined for each of these antenna groups AG By multiplication of the transmission signal of each stream (each antenna group AG) by the above corresponding transmission weight, beamforming is executed and transmission beams Bm are formed. Stream multiplexing is realized as a result. The maximum number of the transmission streams is equal to the number of the antenna groups AG that are included in the antenna group pattern AP.

Control of the antenna groups AG according to the antenna group patterns AP is classified roughly into closed-loop control that is performed by the user apparatus UE and open-loop control that is performed by a base station eNB (macro base station MeNB or small base station SeNB) (details of each control will be described later).

Figure 12:
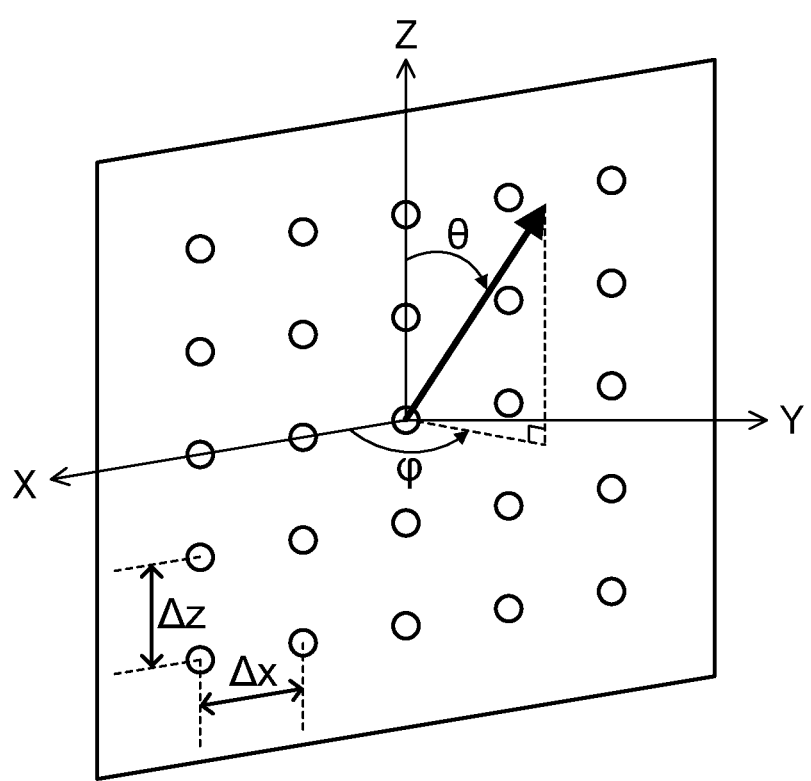
FIG. 12 is a diagram illustrating a transmission weight (a transmission beam angle).

With reference to FIG. 12, specific constituents of the transmission weight w($\varphi$, $\theta$) determined for each antenna group AG will be described. The number of antennas A that are included in the X-axis direction of an antenna group AG (the number of antenna columns) is referred to as $N_{TX}$, and the number of antennas A that are included in the Z-axis direction of the antenna group AG is referred to as $N_{TZ}$. The total number of the antennas A that are included in the antenna group AG is referred to as $N_T$. Here, it is obvious that the relationship $N_T = N_{TX} \times N_{TZ}$ holds.

In FIG. 12, an interval between antennas in the X-axis direction is represented with $\Delta x$, and an interval between antennas in the Z-axis direction is represented with $\Delta z$. In FIG. 12, the Y-axis is a straight line perpendicular both to the X-axis and to the Z-axis (i.e., the Y-axis is a normal of the X-Z plane). The $\varphi$ in the transmission beam angle D is the angle of the transmission beam Bm on the X-Y plane. The $\theta$ in the transmission beam angle D is the angle of the transmission beam Bm on the Y-Z plane.

The transmission weight w($\varphi$, $\theta$) is represented with the following expression.

$$w(\varphi, \theta) = \frac{1}{\sqrt{N_T}} [\exp\{-jW_{0,0}(\varphi, \theta)\} \ldots \exp\{-jW_{N_{Tx}-1,0}(\varphi, \theta)\},$$
$$\ldots \exp\{-jW_{0,N_{Tz}-1}(\varphi, \theta)\} \ldots \exp\{-jW_{N_{Tx}-1,N_{Tz}-1}(\varphi, \theta)\}]^T$$

Here, $W_{n_x,n_z}(\varphi, \theta)$ in the above expression is a value that indicates the amount of phase rotation in the antenna A that is located in the $n_z$-th row of the $n_x$-th column within the antenna group AG, and is specifically represented with the following expression.

$$W_{n_x,n_z}(\varphi, \theta) = \frac{2\pi}{\lambda}(n_x \Delta x \cos\varphi \sin\theta + n_z \Delta z \cos\theta)$$

In the above expression, $\lambda$ is the wavelength of the carrier wave.

1-6. Antenna Group Control

As mentioned above, control of the antenna groups AG in the present embodiment is classified roughly into the closed-loop control and the open-loop control. Roughly speaking, in the closed-loop control, the beam directivity search is executed in the user apparatus UE, and a search result (transmission beam angle D, etc.) is fed back to the base station eNB (macro base station MeNB or small base station SeNB). In the open-loop control, a channel quality indicator (CQI) that indicates the received quality of the reference signal is fed back from the user apparatus UE, and the transmission beam angle D is determined in the base station eNB.

1-6-1. Closed-Loop Control

Figure 13:
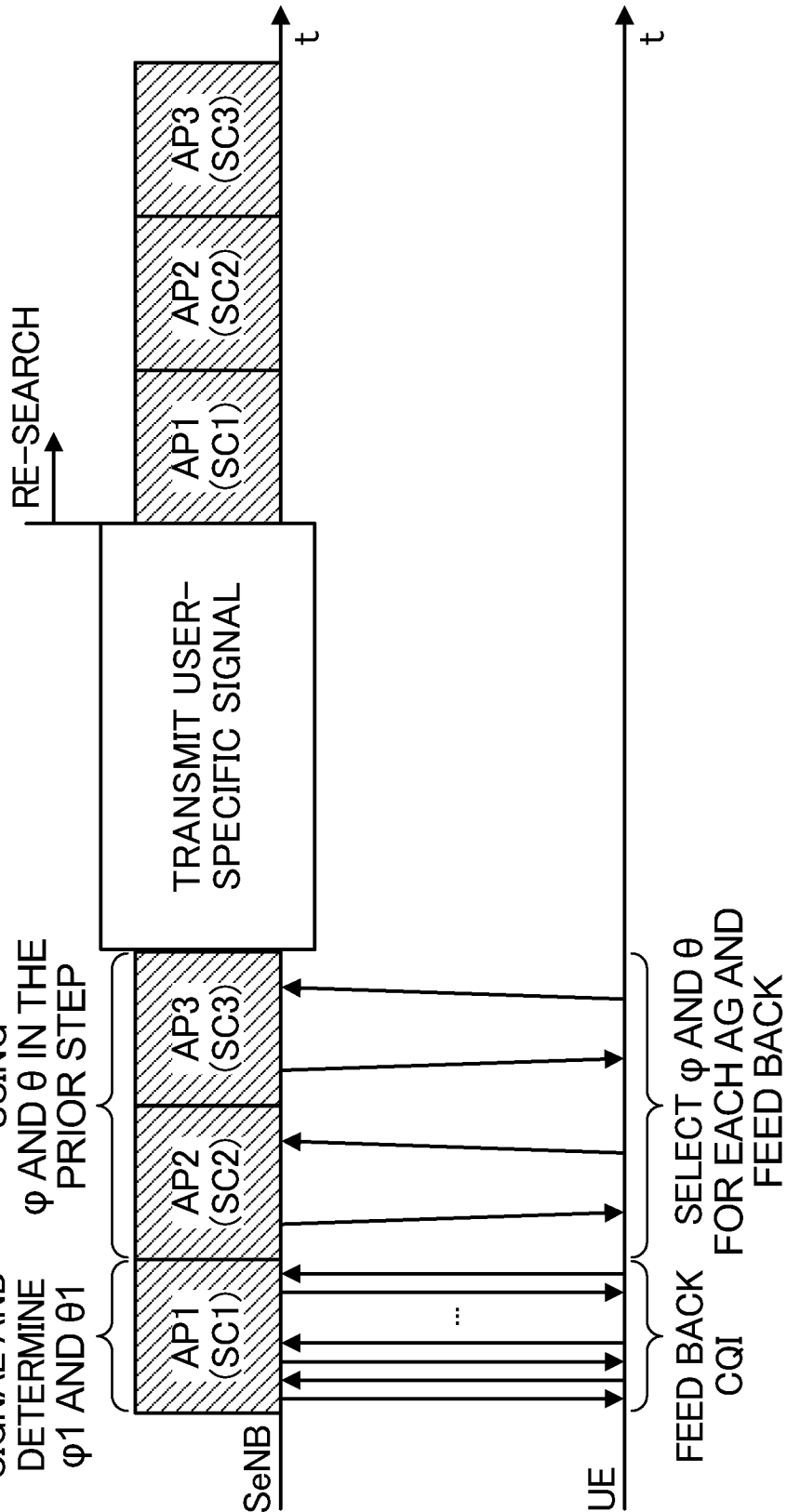
FIG. 13 is a diagram showing a time sequence of closed-loop control of antenna groups.
Figure 14:
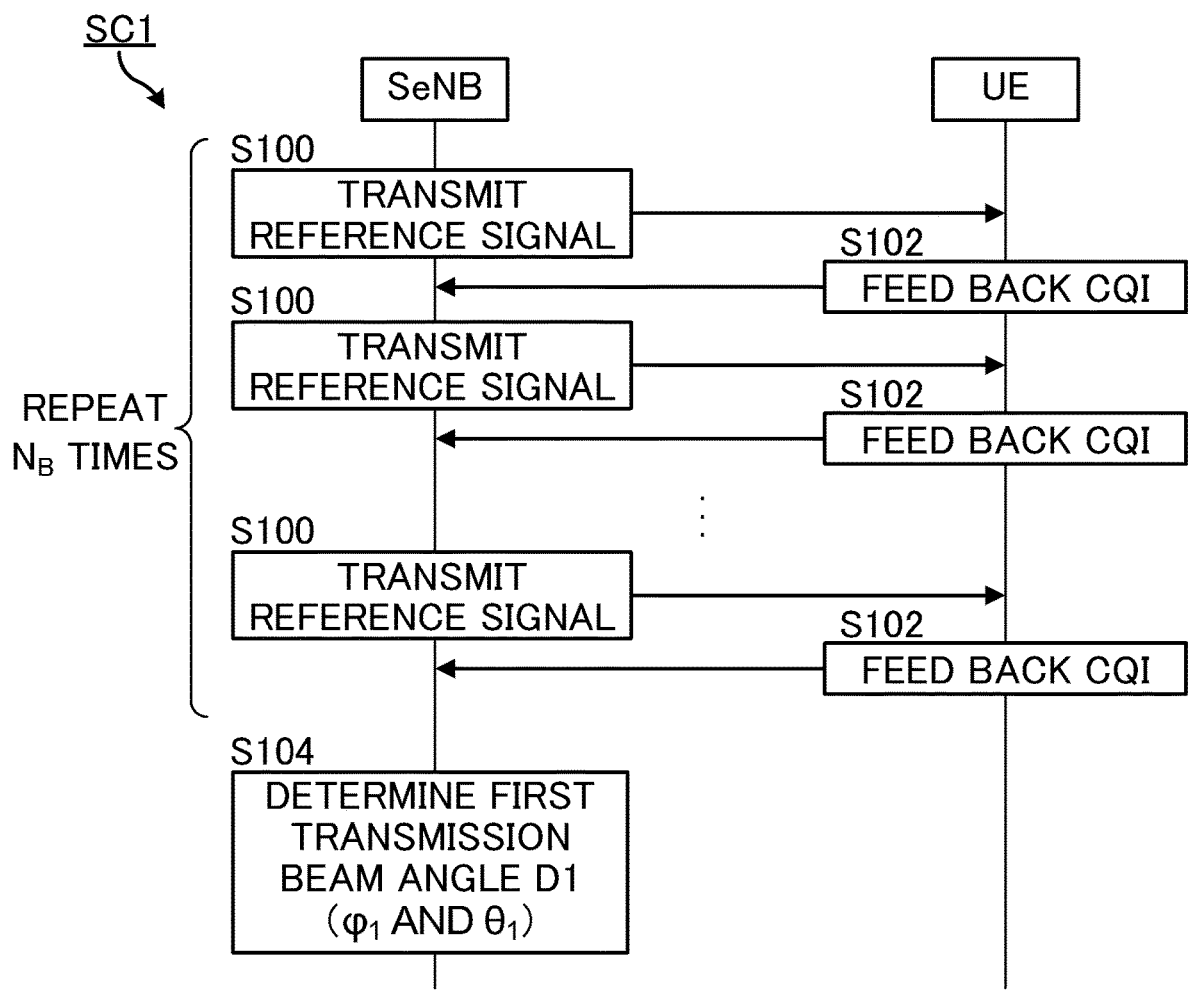
FIG. 14 is an operational flowchart of the first step of the closed-loop control.
Figure 15:
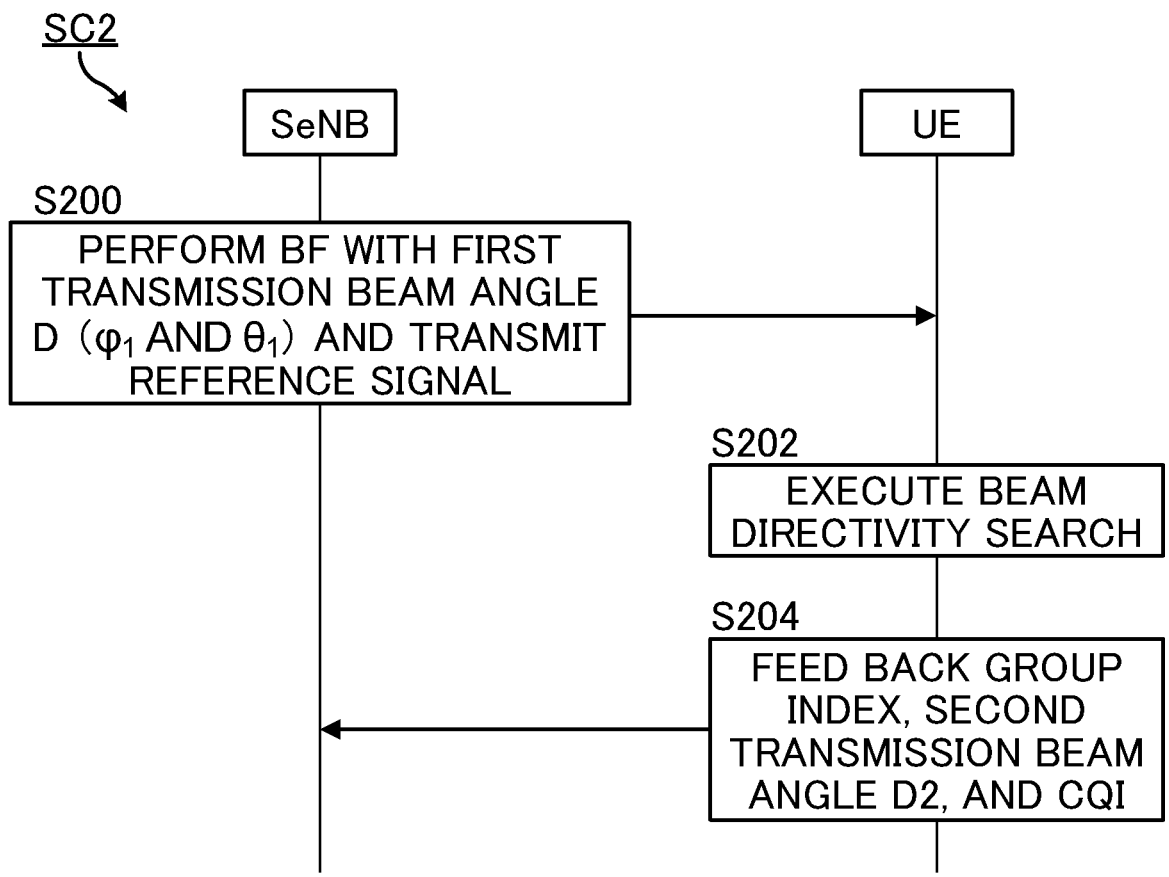
FIG. 15 is an operational flowchart of the second step of the closed-loop control.

With reference to FIGS. 13 to 15, the closed-loop control according to the present embodiment will be described in order of time. A first step SC1, a second step SC2, and a third step SC3 are executed in order, and an antenna group pattern AP that is to be used is determined. The steps SC (SC1 to SC3) respectively correspond to the antenna group patterns AP (AP1 to AP3).

In the first step SC1 in FIG. 13, a first transmission beam angle D1 ($\varphi_1$ and $\theta_1$) is determined for the antenna group AG1 included in the antenna group pattern AP1. FIG. 14 shows the first step SC1 in detail.

At a time point at which the first step SC1 starts, the small base station SeNB does not know the position of the user apparatus UE (i.e., does not know the transmission beam angle D to be used). Thus, in the first step SC1, the small base station SeNB switches in time sequence between candidate transmission beams CBm for use to transmit a reference signal that is for the user apparatus UE to perform a beam search, the candidate transmission beams CBm having transmission beam angles D that differ from one another. As the reference signal, for example, a discovery signal may be used that is specific to the antenna group pattern AP1 and is transmitted using a radio resource (time-frequency resource) dedicated to the antenna group pattern AP1 as shown in FIG. 13.

The small base station SeNB forms a candidate transmission beam CBm and transmits the reference signal using the antenna group AG1 included in the antenna group pattern AP1 (S100). The user apparatus UE receives the reference signal that is included in the candidate transmission beam CBm, and feeds back the CQI of the received reference signal to the small base station SeNB (S102). As described above, since the small base station SeNB switches between the candidate transmission beams CBm while transmitting, the CQIs fed back from the user apparatus UE each indicate the received quality for the corresponding one of the transmission beam angles D. The above steps S100 and S102 are repeated for the $N_B$ number of times, $N_B$ being the number of the candidate transmission beams CBm (the number of the transmission beam angles D serving as candidates). The small base station SeNB determines the transmission beam angle D ($\varphi$ and $\theta$) of the transmission beam Bm corresponding to the highest CQI among the CQIs fed back from the user apparatus UE, as the first transmission beam angle D1 ($\varphi_1$ and $\theta_1$), which is the result of the first step SC1 (S104).

The feedback from the user apparatus UE may be transmitted to the macro base station MeNB, rather than being transmitted directly to the small base station SeNB. In that case, the macro base station MeNB notifies the small base station SeNB of the fed-back information. The same also applies in the second step SC2 onward.

For the beam search in the first step SC1, a hierarchical beam search that in a stepwise manner narrows the width of the transmission beam to be searched for may be used, or a macro-assisted beam search that utilizes auxiliary information that is provided from the macro base station MeNB may be used.

FIG. 15 shows the second step SC2 in detail. In the second step SC2, for the antenna groups AG2 (AG2:1, AG2:2, . . . ) included in the antenna group pattern AP2, their respective second transmission beam angles D2 ($\varphi_{2:1}$ and $\theta_{2:1}$, $\varphi_{2:2}$ and $\theta_{2:2}$, . . . ) are determined. Details are described below.

The small base station SeNB performs beamforming based on the first transmission beam angle D1 determined in the prior step, and transmits reference signals that have sequences that differ from one another between the antenna groups AG2 (S200). The user apparatus UE performs, for each of the antenna groups AG2, the beam directivity search of the corresponding reference signal (S202). That is, based on the reference signal transmitted from each antenna group AG2, the user apparatus UE estimates channel information (channel matrix) H that indicates the state of the corresponding propagation path. The user apparatus UE, for each antenna group AG2, multiplies the estimated channel information H by each of multiple candidate transmission weights $w(\varphi, \theta)$ to calculate a plurality of $Hw(\varphi, \theta)$, the candidate transmission weights $w(\varphi, \theta)$ having candidate transmission beam angles D ($\varphi$ and $\theta$) that differ from one another. Based on the plurality of calculated $Hw(\varphi, \theta)$, the transmission beam angle D ($\varphi$ and $\theta$) at which the expected throughput is maximized is determined as the second transmission beam angle D2 for that antenna group AG2, as a result of the second step SC2. The user apparatus UE preferably executes the above beam directivity searches for the antenna groups AG2 in parallel.

Similarly to step SC1, discovery signals specific to the antenna group pattern AP2 are preferably used as the reference signals. Since the antenna group pattern AP2 includes the multiple antenna groups AG2, the discovery signals of step SC2 are a set of signal sequences corresponding to these antenna groups AG2.

For each antenna group AG2, the user apparatus UE feeds back to the small base station SeNB a group index that identifies that antenna group AG2, the second transmission beam angle D2 for that antenna group AG2, and the CQI of the reference signal from that antenna group AG2 (S204).

Similarly to the second step SC2, in the n-th step SCn, for each of the antenna groups AGn (AGn:1, AGn:2, . . . ) that are included in the antenna group pattern APn, the n-th transmission beam angle Dn (e.g., ($\varphi_{n:1}$ and $\theta_{n:1}$, $\varphi_{n:2}$ and $\theta_{n:2}$, . . . ) is determined based on the (n−1)-th transmission beam angle D(n−1) determined in the (n−1)-th step, and is then fed back to the small base station SeNB together with the CQI for that antenna group AGn.

After the above beam directivity searches are completed for all the antenna group patterns AP, the user apparatus UE feeds back to the small base station SeNB a use antenna group pattern UAP and the transmission beam angle D for each of the antenna groups AG (use antenna groups UAG) included in that antenna group pattern AP, with which use antenna group pattern UAP and transmission beam angles D an expected throughput is maximized.

Thereafter, the small base station SeNB transmits user-specific signals (DMRS, user-specific data, etc.) using the fed-back use antenna group pattern UAP and the fed-back transmission beam angles D (i.e., reception results of the reference signals). In other words, in each of the antenna groups AG included in the fed-back use antenna group pattern UAP, precoding is performed using the corresponding one of the fed-back transmission beam angles D to transmit the user-specific signals.

The "expected throughput" in the above control operation is an estimated throughput that is calculated theoretically, statistically, or empirically. The "expected throughput" may be a user throughput at the user apparatus UE, or may be a system throughput.

Figure 16:
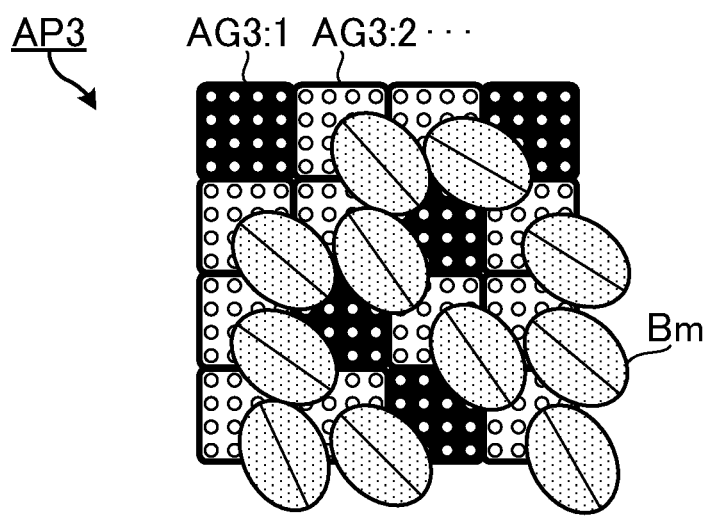
FIG. 16 is a diagram illustrating selection of antenna groups to be used.

In the transmission of the user-specific signals, the small base station SeNB need not use all the antenna groups AG that are included in the use antenna group pattern UAP. The small base station SeNB preferably excludes, from the antenna groups AG included in the use antenna group pattern UAP, antenna groups AG for which the corresponding fed-back CQIs are smaller than a predetermined threshold value, to execute transmission. FIG. 16 shows that in some antenna groups AG (e.g., AG3:1, AG3:4, . . . ) that are shown in black and for which the CQIs are smaller than the predetermined threshold, transmission beams Bm are not formed, and thus radio signals are not transmitted from these antenna groups AG The above-described determination as to which antenna groups AG to be used may be performed by the user apparatus UE or by the base station eNB.

In each of the above steps SC, the user apparatus UE may further determine phase difference information w and may feed back the determined phase difference information w to the small base station SeNB. The phase difference information w is information for further optimizing the n-th transmission beam angle Dn determined in each step SC by the user apparatus UE, and indicates a shift (deflection angle d ($\varphi$ and $\theta$)) from the n-th transmission beam angle Dn. The user apparatus UE, for each antenna group AG, after determining the n-th transmission beam angle Dn at which the expected throughput is greatest, searches for a deflection angle d ($\varphi$ and $\theta$) of the n-th transmission beam angle Dn with which deflection angle d that expected throughput will be further increased, and determines the deflection angle d ($\varphi$ and $\theta$) that realizes the maximum expected throughput. The above calculation of the phase difference information w is executed separately from the search for (determination of) the n-th transmission beam angle Dn, and is thus referred to as a disjoint search.

Here, the unit angle (smallest value between beam angles) of deflection angles d used in determination of the phase difference information w is preferably smaller than the unit angle of the candidate transmission beam angles D used in the search for the n-th transmission beam angle Dn. In this way, finer adjustment of the transmission beam angles D is possible.

The above calculation of the phase difference information w may be executed in parallel with the search for the n-th transmission beam angle Dn. Such a concurrent search operation is referred to as a joint search. With the joint search, it is possible to further enhance the throughput in comparison to the disjoint search. The operation load of the joint search is greater than that of the disjoint search, however, and thus from the viewpoint of suppressing the amount of processing, the disjoint search is preferable.

1-6-2. Open-Loop Antenna Control

Figure 17:
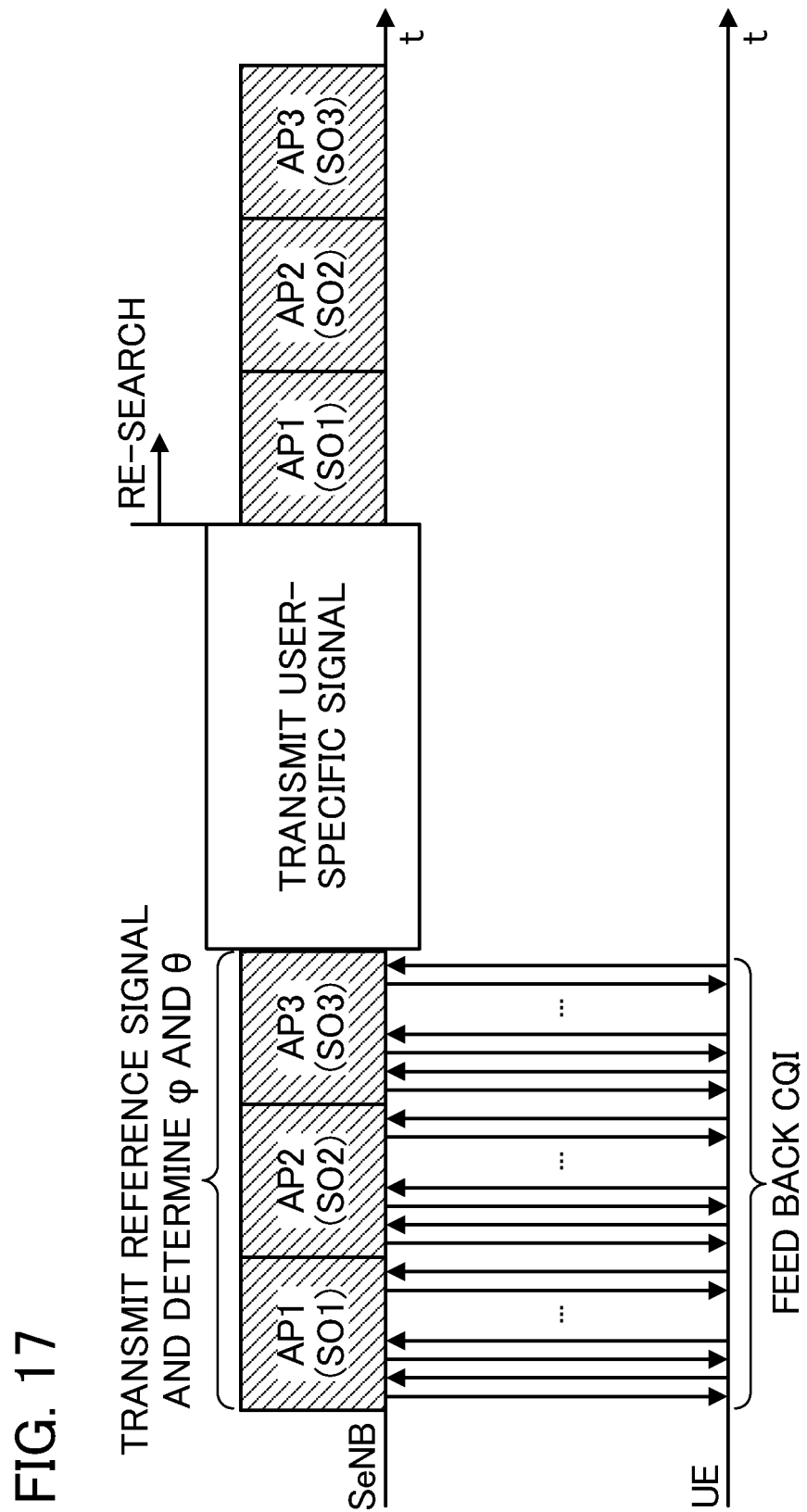
FIG. 17 is a diagram showing a time sequence of open-loop control of antenna groups.
Figure 18:
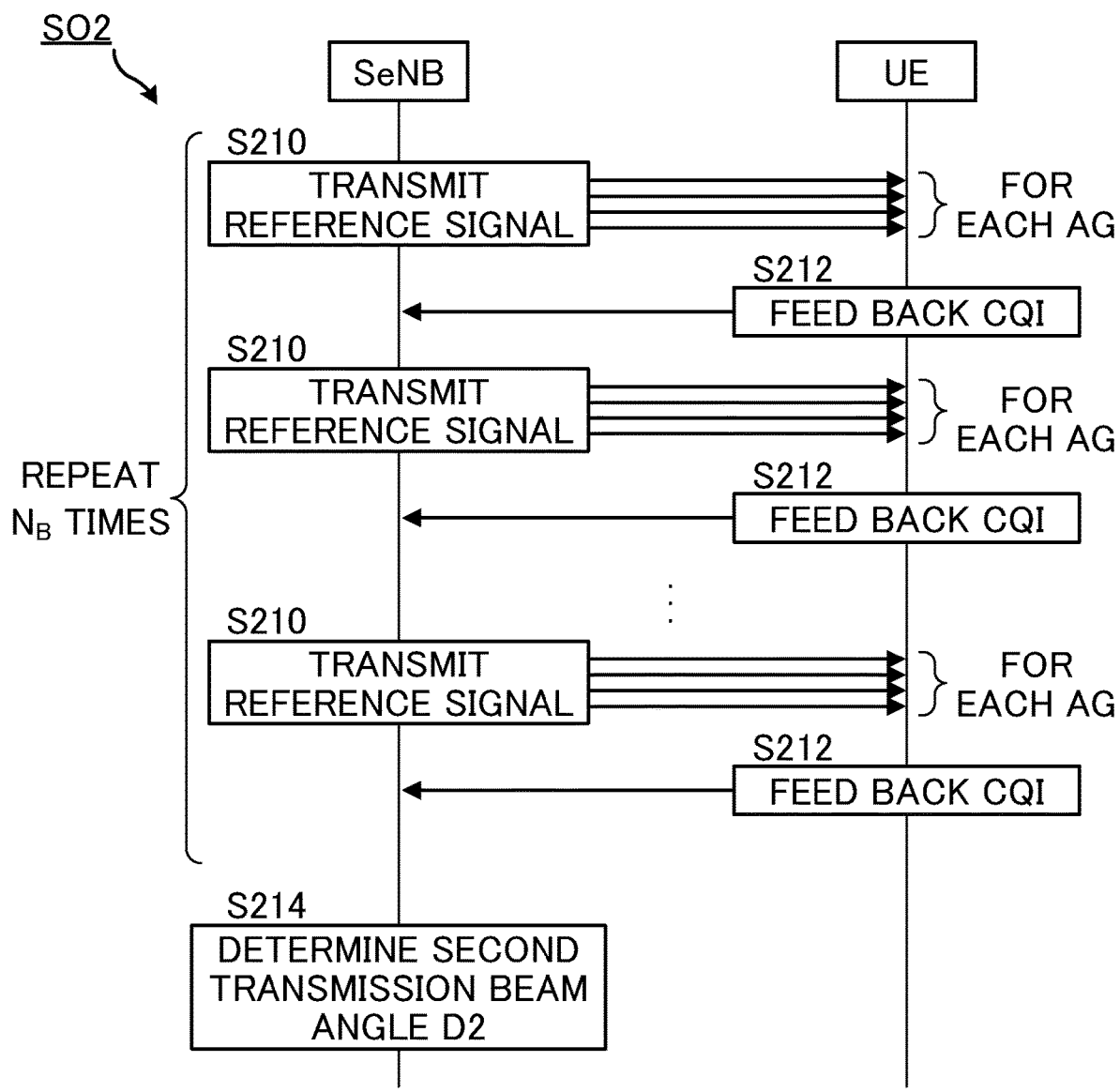
FIG. 18 is an operational flowchart of the second step of the open-loop control.

With reference to FIGS. 17 and 18, the open-loop control of the present embodiment will be described in order of time. A first step SO1, a second step SO2, and a third step SO3 are executed in order, and an antenna group pattern AP to be used is determined. The steps SO (SO1 to SO3) respectively correspond to the antenna group patterns AP (AP1 to AP3).

In the first step SO1 in FIG. 17, similarly to the first step SC1 (S100 to S104 in FIG. 14) of the closed-loop control, the small base station SeNB determines a first transmission beam angle D1 ($\varphi_1$ and $\theta_1$) for the antenna group AG1 included in the antenna group pattern AP1, based on CQI feedback from the user apparatus UE.

FIG. 18 shows the second step SO2 in detail. Similarly to the first step SC1 of the closed-loop control, for each of the antenna groups AG2, the small base station SeNB switches in time sequence between candidate transmission beams CBm for use to transmit a reference signal for the beam search, the candidate transmission beams CBm having transmission beam angles D that differ from one other. Similarly to the above-described closed-loop control, in each step SO, a discovery signal specific to each antenna group pattern AP is preferably used as the reference signal.

The small base station SeNB forms a candidate transmission beam CBm for each of the antenna groups AG2 included in the antenna group pattern AP2 and transmits reference signals with sequences that differ from one another between these antenna groups AG2 in the antenna group pattern AP2 (S210). The user apparatus UE receives the reference signals included in the candidate transmission beams CBm from the antenna groups AG2, and feeds back the CQIs of the received reference signals to the small base station SeNB (S212). Since each antenna group AG2 switches between multiple candidate transmission beams CBm while transmitting, the CQIs that are fed back from the user apparatus UE each indicate the received quality for the corresponding one of the transmission beam angles D. The above steps S210 and S212 are repeated for the $N_B$ number of times, $N_B$ being the number of the candidate transmission beams CBm (the number of transmission beam angles D serving as candidates) for each antenna group AG2. The small base station SeNB determines, for each antenna group AG2, the transmission beam angle D ($\varphi$ and $\theta$) of the transmission beam Bm corresponding to the greatest CQI among the CQIs fed back for that antenna group AG2 from the user apparatus UE as one of the second transmission beam angles D2 resulting from the second step SO1 (S214). It is preferable that the transmission beams Bm that are orthogonal to each other between the antenna groups AG be selected.

Similarly to the second step SO2, in the n-th step SOn, the user apparatus UE feeds back to the small base station SeNB the CQIs of reference signals transmitted from the antenna groups AGn (AGn:1, AGn:2, . . . ) that are included in the antenna group pattern APn. The above CQI feedback is repeated for the $N_B$ number of times, $N_B$ being the number of candidate transmission beams CBm (the number of transmission beam angles D serving as candidates) in each antenna group AGn.

The user apparatus UE may use, as the beam search focus in the n-th step, the transmission beam angle D(n−1) determined in the prior step ((n−1)-th step). The transmission beam angle D(n−1) is preferably transmitted from the small base station SeNB to the user apparatus UE.

After the above beam directivity searches are completed for all the antenna group patterns AP, the small base station SeNB selects a use antenna group pattern UAP and the transmission beam angles D for the antenna groups AG included in the use antenna group pattern UAP (use antenna groups UAG), with which use antenna group pattern UAP and transmission beam angles D an expected throughput is maximized, and transmits user-specific signals (DMRS, user-specific data, etc.).

In the above open-loop control, determination as to which antenna groups AG to be used may be performed based on the fed-back CQIs, as in the closed-loop control.

Unlike in the closed-loop control, in the open-loop control, determination and feedback of the phase difference information w by the user apparatus UE are not executed. This is because, in the open-loop control, the user apparatus UE merely performs feedback of CQIs.

1-6-3. Re-Search

In both the closed-loop control and the open-loop control, a re-search (SC1 to SC3 or SO1 to SO3) is executed when a predetermined condition is satisfied. For example, a re-search is executed when the throughput in the user apparatus UE drops below a predetermined threshold value during transmission of user-specific signals. A re-search can be initiated under any other freely-chosen condition.

1-7. Configuration of Each Element
1-7-1. Configuration of Macro Base Station

Figure 19:
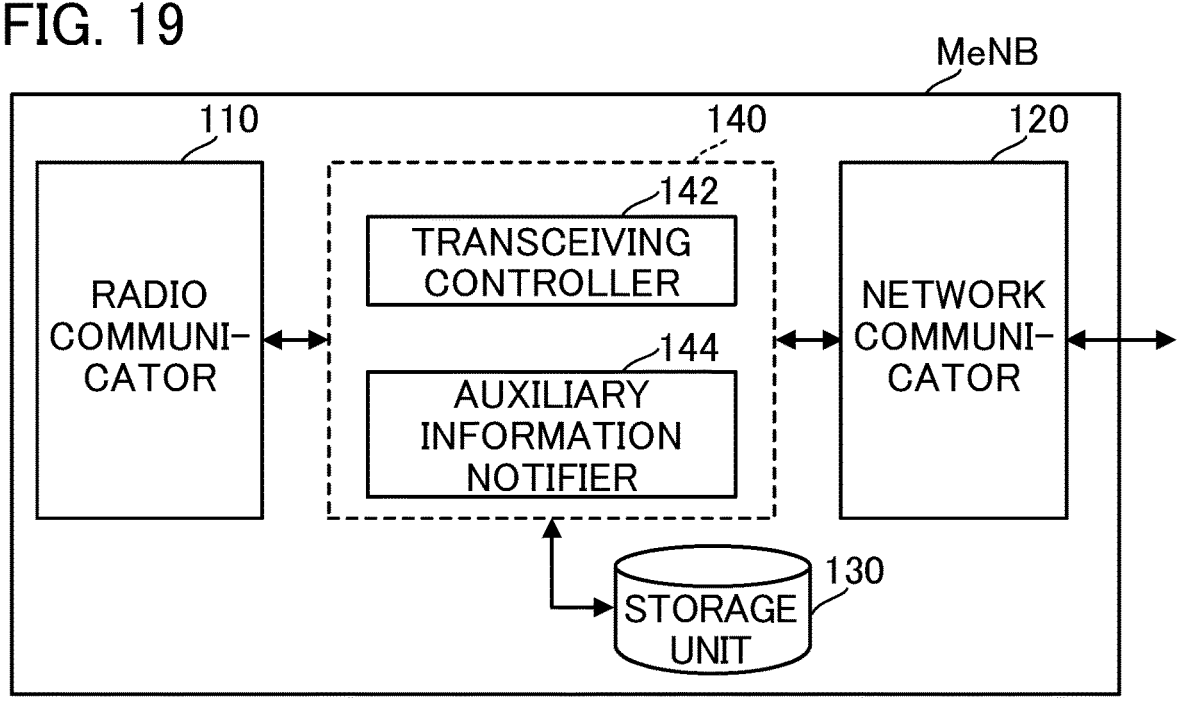
FIG. 19 is a block diagram showing a configuration of a macro base station.

FIG. 19 is a configuration block diagram of the macro base station MeNB according to the present embodiment. The macro base station MeNB includes a radio communicator 110, a network communicator 120, a storage unit 130, and a controller 140. The radio communicator 110 is an element to execute radio communication with the user apparatus UE, and includes a transceiving antenna, receiving circuitry, and transmitting circuitry. The network communicator 120 is an element to execute communication with other nodes, such as the small base station SeNB, within a network, and exchanges signals with the other nodes. The storage unit 130 stores information relating to communication control and a computer program that is described later.

The controller 140 includes a transceiving controller 142 and an auxiliary information notifier 144. The transceiving controller 142 performs overall control of communication that is executed by the user apparatus UE and the small base station SeNB. Also, the transceiving controller 142 notifies the small base station SeNB of the feedback from the user apparatus UE. The auxiliary information notifier 144 provides, when needed, the user apparatus UE and the small base station SeNB with auxiliary information that is required in the macro-assisted beam search. The controller 140 and the elements in the controller 140 are each a functional block that is realized by a CPU (Central Processing Unit) in the macro base station MeNB executing the computer program stored in the storage unit 130 and functioning in accordance with the computer program.

1-7-2. Configuration of Small Base Station

Figure 20:
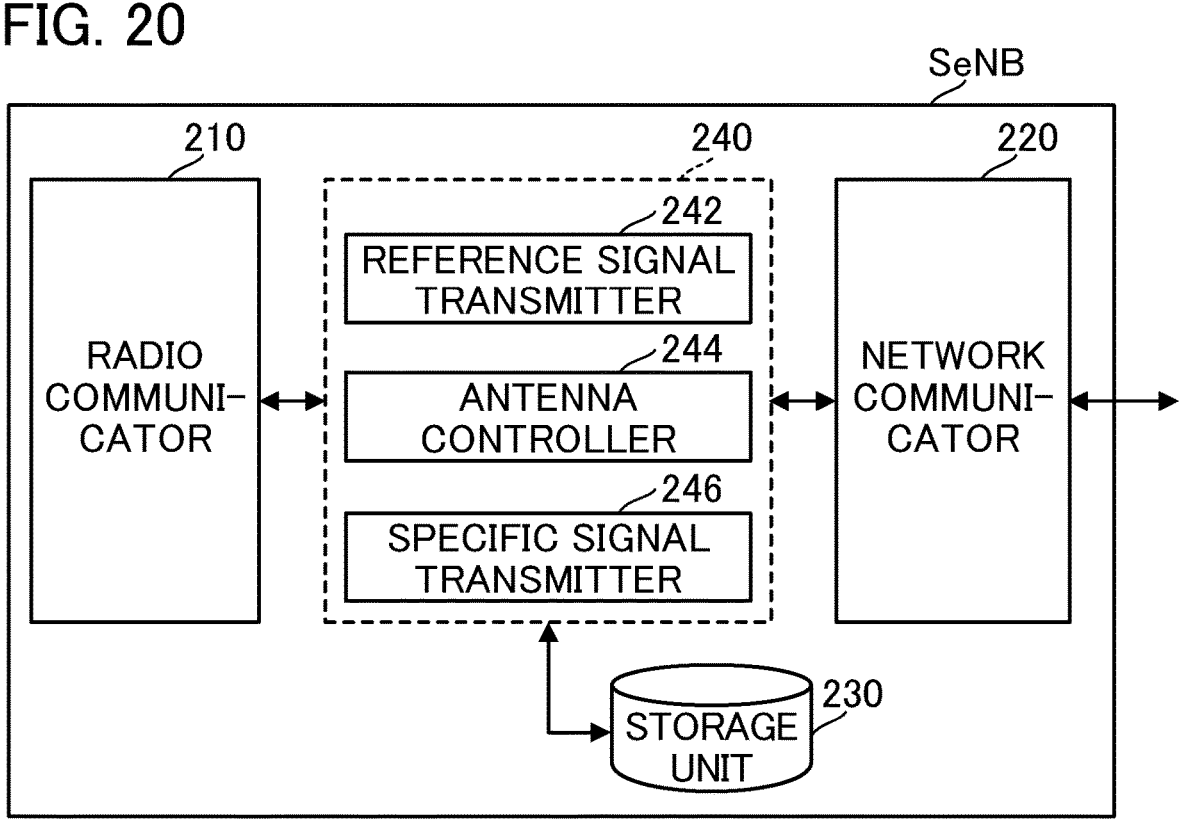
FIG. 20 is a block diagram showing a configuration of a small base station.

FIG. 20 is a configuration block diagram of the small base station SeNB according to the present embodiment. The small base station SeNB includes a radio communicator 210, a network communicator 220, a storage unit 230, and a controller 240. The radio communicator 210 is an element to execute radio communication with the user apparatus UE, and includes receiving circuitry, transmitting circuitry, and an antenna apparatus AA that has the multiple antennas A. The network communicator 220 is an element to execute communication with other nodes, such as the macro base station MeNB, within the network, and exchanges signals with the other nodes. The storage unit 230 stores information relating to communication control and a computer program that is described later.

The controller 240 includes a reference signal transmitter 242, an antenna controller 244, and a specific signal transmitter 246. The reference signal transmitter 242 generates the reference signals (e.g., discovery signals) having sequences that differ from one another between antenna groups AG, and transmits the reference signals by the respective antenna groups AG The antenna controller 244, in the closed-loop control, controls the antenna apparatus AA based on feedback on the beam directivity search results from the user apparatus UE. In the open-loop control, the antenna controller 244 determines the transmission beam angles D based on feedback on the reference signal CQIs from the user apparatus UE to control the antenna apparatus AA. The specific signal transmitter 246 transmits the user-specific signals based on the determined use antenna group pattern UAP and the determined transmission beam angles D. The controller 240 and the elements in the controller 240 are each a functional block that is realized by a CPU (Central Processing Unit) in the small base station SeNB executing the computer program stored in the storage unit 230 and functioning in accordance with the computer program.

1-7-3. Configuration of User Apparatus

Figure 21:
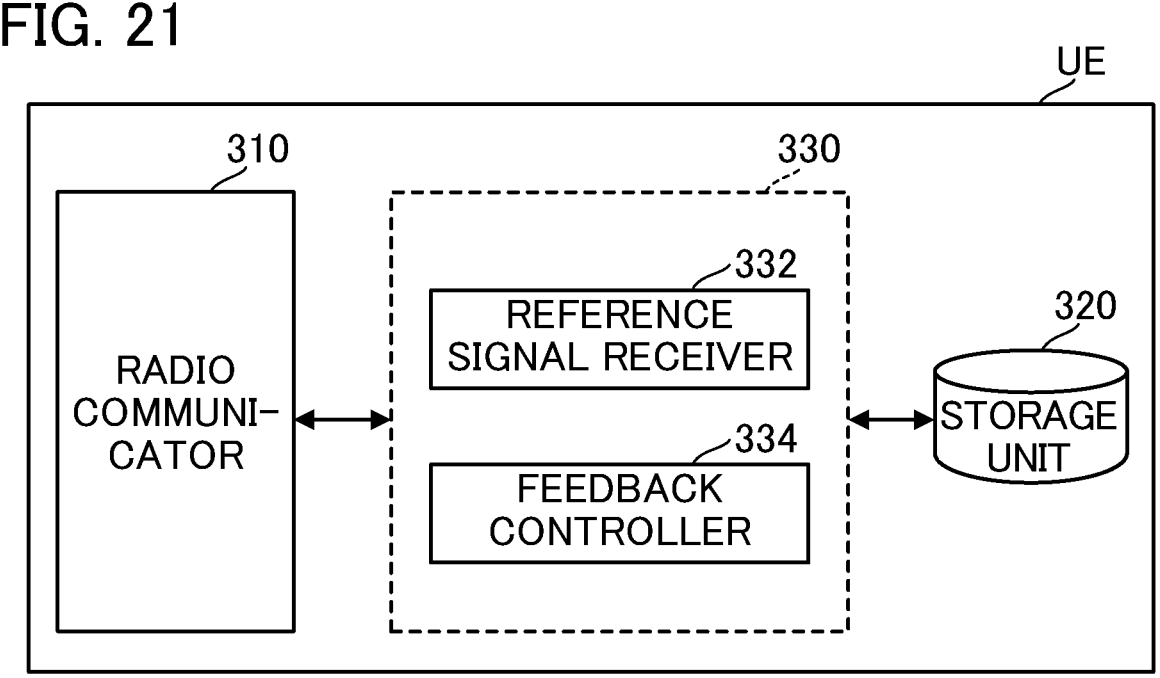
FIG. 21 is a block diagram showing a configuration of a user apparatus.

FIG. 21 is a configuration block diagram of the user apparatus UE according to the present embodiment. The user apparatus UE includes a radio communicator 310, a storage unit 320, and a controller 330. Illustration of elements such as an output device that outputs audio, video or the like, and an input device that receives instructions from a user, is omitted for brevity. The radio communicator 310 is an element to execute radio communication with the macro base station MeNB and with the small base station SeNB, and includes a transceiving antenna, receiving circuitry that receives and converts radio signals (radio waves) into electrical signals, and transmitting circuitry that converts electrical signals, such as control signals and user signals, into radio signals (radio waves) and transmits these radio signals. The storage unit 320 stores information relating to communication control and a computer program that is described later.

The controller 330 includes a reference signal receiver 332 and a feedback controller 334. The reference signal receiver 332 receives the reference signals transmitted from the macro base station MeNB and those from the small base station SeNB. The feedback controller 334 feeds back the reception results of the reference signals to the macro base station MeNB or to the small base station SeNB. The feedback controller 334, in the closed-loop control, executes processing such as the above-described beam directivity searches and feeds back the results thereof. In the open-loop control, the feedback controller 334 calculates the CQIs of reference signals and feeds back the results thereof. The controller 330 and the elements in the controller 330 are each a functional block that is realized by a CPU (Central Processing Unit) in the user apparatus UE executing the computer program stored in the storage unit 320 and functioning in accordance with the computer program.

1-8. Effects of Present Embodiment

According to the configuration of the present embodiment as described above, the antenna group pattern AP (use antenna group pattern UAP) is determined based on channel information feedback from the user apparatus UE for each antenna group AG, and the transmission beam angles D for the antenna groups AG (use antenna groups UAG) that are included in the use antenna group pattern UAP are determined, and the determined use antenna group patterns UAP and the determined transmission beam angles D are used in the small base station SeNB to transmit radio signals. Accordingly, with the massive MIMO transmission of the present embodiment, the antennas A are appropriately controlled in units of antenna groups AG and multi-beam multiplexing is realized, while the amount of information that is fed back is suppressed. More specifically, according to the above configuration, the control processing for each of the antenna groups AG results in formation of the multiple transmission beams Bm, and thus suppression of the processing load and improvement in the throughput by stream multiplexing are together realized.

2. Modifications

The above embodiment can be modified in various manners. Modes of specific modifications will be exemplified below. Any two or more modes selected from the above embodiment and the following examples can be combined as appropriate, as long as they do not conflict with each other.

2(1). Modification 1

In the above embodiment, the radio communication system CS includes the macro base station MeNB and the small base station SeNB. However, the radio communication system CS may include only the small base station SeNB.

2(2). Modification 2

The number of antennas A in the horizontal direction and that in the vertical direction are the same in each of the antenna groups AG of the above embodiment. However, in one or more antenna groups AG, the number of antennas A in the horizontal direction and that in the vertical direction may differ. Also, in each of the antenna group patterns AP of the above embodiment, the number of antenna groups AG in the horizontal direction and that in the vertical direction are the same. However, in one or more antenna group patterns AP, the number of antenna groups AG in the horizontal direction and that in the vertical direction may differ.

2(3). Modification 3

In the above embodiment, there are set in the small base station SeNB three antenna group patterns AP. Alternatively, two antenna group patterns AP or four or more antenna group patterns AP may be set. For example, in a case where there are 1024 antennas A, there may be set an antenna group pattern AP1 that includes a first antenna group AG1 with the 1024 antennas A, an antenna group pattern AP2 that includes second antenna groups AG2 each with 256 antennas A, an antenna group pattern AP3 that includes third antenna groups AG3 each with 64 antennas A, and an antenna group pattern AP4 that includes fourth antenna groups AG each with 16 antennas A.

2(4). Modification 4

Figure 22:
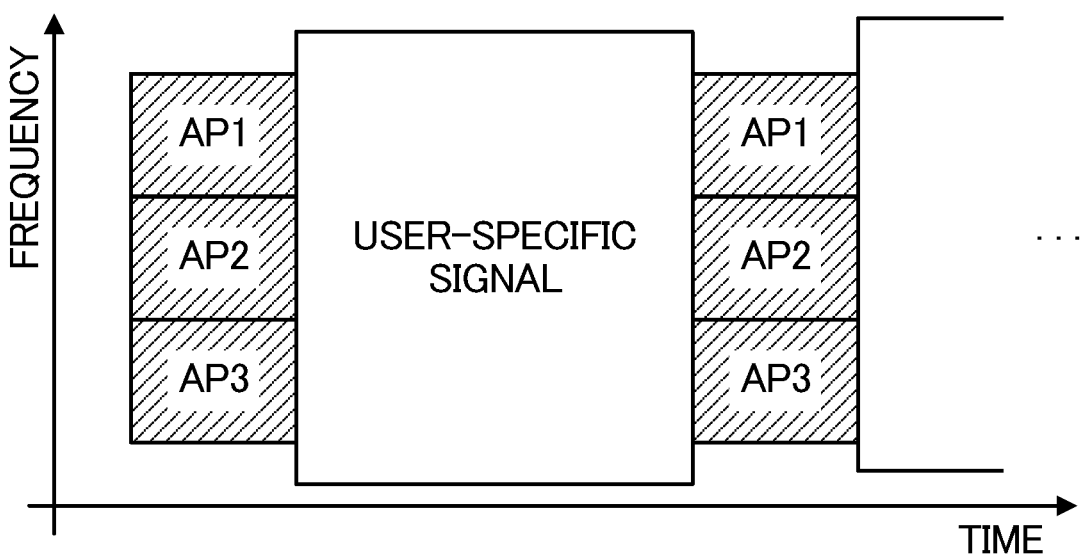
FIG. 22 is a diagram illustrating a modification in which reference signals are transmitted in parallel.

In the above embodiment, the reference signals corresponding to the antenna group patterns AP are transmitted in order of time (e.g., FIGS. 13 and 16). However, as shown in FIG. 22, the reference signals corresponding to the antenna group patterns AP may be transmitted in parallel using different frequency bands. In this configuration, however, the transmission bandwidth for the reference signals will be more spread out and the results of the beam directivity searches in the prior step cannot be used, and therefore, the transmission distance (coverage) of the reference signals will be reduced. Accordingly, from the viewpoint of transmission distance (coverage), it is more preferable to employ the configuration of the embodiment.

2(5). Modification 5

In the above embodiment, the small base station SeNB is provided with the antenna controller 244. However, the antenna controller can be disposed in any suitable location in the radio communication system CS. For example, the macro base station MeNB may be provided with the antenna controller, or another node may be provided with the antenna controller.

2(6). Modification 6

The user apparatus UE is any suitable apparatus capable of radio communication with base stations (macro base station MeNB and small base station SeNB) within the network. The user apparatus UE may, for example, be a mobile phone terminal such as a feature phone or a smartphone, a tablet terminal, a desktop personal computer, a laptop personal computer, a UMPC (Ultra-Mobile Personal Computer), a portable game machine, or any other radio terminal.

2(7). Modification 7

The functions executed by the CPU in each element (user apparatus UE, small base station SeNB, and macro base station MeNB) within the radio communication system CS may instead be executed by hardware, or by a programmable logic device, such as an FPGA (Field Programmable Gate Array) or a DSP (Digital Signal Processor).

DESCRIPTION OF REFERENCE SIGNS

MeNB . . . macro base station; 110 . . . radio communicator; 120 . . . network communicator; 130 . . . storage unit; 140 . . . controller; 142 . . . transceiving controller; 144 . . . auxiliary information notifier; SeNB . . . small base station; 210 . . . radio communicator; 220 . . . network communicator; 230 . . . storage unit; 240 . . . controller; 242 . . . reference signal transmitter; 244 . . . antenna controller; 246 . . . specific signal transmitter; UE . . . user apparatus; 310 . . . radio communicator; 320 . . . storage unit; 330 . . . controller; 332 . . . reference signal receiver; 334 . . . feedback controller; A . . . antenna; AA . . . antenna apparatus; AG . . . antenna group; AP . . . antenna group pattern; Bm . . . transmission beam; C1 . . . macro cell; C2 . . . small cell; CS . . . radio communication system; D . . . transmission beam angle; eNB . . . base station; f . . . frequency; G . . . beamforming gain; PL . . . propagation loss; W . . . carrier; λ . . . wavelength; co . . . phase difference information.

The invention claimed is:

1. A communication control method for a small base station and a user apparatus to perform radio communication with each other, the small base station performing radio communication with the user apparatus using multiple antennas, wherein there are set multiple antenna groups that each include all or a portion of the antennas and multiple antenna group patterns that each include at least one of the antenna groups, the method comprising:

transmitting, from the small base station, reference signals with sequences that differ from one another between antenna groups that are included in a same antenna group pattern;

receiving the reference signals in the user apparatus;

determining, based on a reception result of the reference signals, a use antenna group pattern and at least one use antenna group that are to be used for transmission of a radio signal from the small base station, the use antenna group pattern being determined from among the multiple antenna group patterns, the at least one use antenna group being determined from among the multiple antenna groups, and determining, based on the reception result of the reference signals, a transmission beam angle for each of the at least one use antenna group that is included in the use antenna group pattern, wherein for each antenna group pattern that includes multiple antenna groups, the multiple antennas of the small base station are sectioned into those multiple antenna groups, and each antenna of the small base station is included in one of those multiple antenna groups belonging to that antenna group pattern, wherein the number of antennas included in each antenna group differs between the antenna group patterns, and wherein the use antenna group pattern and the transmission beam angle for each of the at least one use antenna group are determined in the small base station such that an expected throughput is maximized.

2. The communication control method according to claim 1, wherein the multiple antenna group patterns includes a first to an N-th (where N is a natural number of two or more) antenna group patterns, and a number of antenna groups included in an n-th (where n is a natural number satisfying N≥n≥2) antenna group pattern is greater than a number of antenna groups included in an (n−1)-th antenna group pattern, and wherein in determining the transmission beam angle, the transmission beam angle is determined in order from an antenna group pattern that includes fewest antenna groups, and at least one transmission beam angle is determined for the n-th antenna group pattern based on at least one transmission beam angle that is determined for the (n−1)-th antenna group pattern.

3. The communication control method according to claim 2, wherein as the reference signals, discovery signals that are specific to each antenna group pattern and that are transmitted using a radio resource dedicated to each antenna group pattern are used.

4. The communication control method according to claim 2, wherein the reception result of the reference signals includes a received quality of a corresponding one of the reference signals at the user apparatus for each of the antenna groups, and wherein the method further comprises excluding, from the use antenna group pattern, an antenna group that indicates a received quality that is smaller than a threshold value.

5. The communication control method according to claim 1, wherein as the reference signals, discovery signals that are specific to each antenna group pattern and that are transmitted using a radio resource dedicated to each antenna group pattern are used.

6. The communication control method according to claim 5, wherein the reception result of the reference signals includes a received quality of a corresponding one of the reference signals at the user apparatus for each of the antenna groups, and wherein the method further comprises excluding, from the use antenna group pattern, an antenna group that indicates a received quality that is smaller than a threshold value.

7. The communication control method according to claim 1, wherein the reception result of the reference signals includes a received quality of a corresponding one of the reference signals at the user apparatus for each of the antenna groups, and wherein the method further comprises excluding, from the use antenna group pattern, an antenna group that indicates a received quality that is smaller than a threshold value.

8. A radio communication system comprising:

a user apparatus; and a small base station that has multiple antennas, wherein there are set multiple antenna groups that each include all or a portion of the antennas and multiple antenna group patterns that each include at least one of the antenna groups, the small base station including:
- a reference signal transmitter configured to transmit reference signals with sequences that differ from one another between antenna groups that are included in a same antenna group pattern, the user apparatus including:
- a reference signal receiver configured to receive the reference signals transmitted from the small base station, and the radio communication system further comprising:
- an antenna controller configured to:
  - determine, based on a reception result of the reference signals, a use antenna group pattern and at least one use antenna group that are to be used for transmission of a radio signal from the small base station, the use antenna group pattern being determined from among the multiple antenna group patterns, the at least one use antenna group being determined from among the multiple antenna groups, and
  - determine, based on the reception result of the reference signals, a transmission beam angle for each of the at least one use antenna group that is included in the use antenna group pattern, wherein for each antenna group pattern that includes multiple antenna groups, the multiple antennas of the small base station are sectioned into those multiple antenna groups, and each antenna of the small base station is included in one of those multiple antenna groups belonging to that antenna group pattern, and wherein the number of antennas included in each antenna group differs between the antenna group patterns, and wherein the use antenna group pattern and the transmission beam angle for each of the at least one use antenna group are determined in the small base station such that an expected throughput is maximized.

9. A small base station comprising multiple antennas, wherein there are set multiple antenna groups that each include all or a portion of the antennas and multiple antenna group patterns that each include at least one of the antenna groups, the small base station further comprising:
- a reference signal transmitter configured to transmit, to a user apparatus, reference signals with sequences that differ from one another between antenna groups that are included in a same antenna group pattern;
- a specific signal transmitter configured to transmit user-specific data using a use antenna group pattern and at least one use antenna group that are determined based on a reception result of the reference signals in the user apparatus, the use antenna group pattern being determined from among the multiple antenna group patterns, the at least one use antenna group being determined from among the multiple antenna groups, and
- an antenna controller configured to determine a transmission beam angle for each of the at least one use antenna group that is included in the use antenna group pattern, based on the reception result of the reference signals, wherein for each antenna group pattern that includes multiple antenna groups, the multiple antennas of the small base station are sectioned into those multiple antenna groups, and each antenna of the small base station is included in one of those multiple antenna groups belonging to that antenna group pattern, and wherein the number of antennas included in each antenna group differs between the antenna group patterns; and wherein the use antenna group pattern and the transmission beam angle for each of the at least one use antenna group are determined in the small base station such that an expected throughput is maximized.

10. A user apparatus comprising:
a radio communicator configured to perform radio communication with a small base station that has multiple antennas, wherein there are set multiple antenna groups that each include all or a portion of the antennas and multiple antenna group patterns that each include at least one of the antenna groups, the user apparatus further comprising:
- a reference signal receiver configured to receive reference signals that are transmitted from the small base station, the reference signals having sequences that differ from one another between antenna groups that are included in a same antenna group pattern; and
- an antenna controller configured to:
  - determine, based on a reception result of the reference signals, a use antenna group pattern and at least one use antenna group that are to be used for transmission of a radio signal from the small base station, the use antenna group pattern being determined from among the multiple antenna group patterns, the at least one use antenna group being determined from among the multiple antenna groups,
  - determine, based on the reception result of the reference signals, a transmission beam angle for each of the at least one use antenna group that is included in the use antenna group pattern, wherein for each antenna group pattern that includes multiple antenna groups, the multiple antennas of the small base station are sectioned into those multiple antenna groups, and each antenna of the small base station is included in one of those multiple antenna groups belonging to that antenna group pattern, and wherein the number of antennas included in each antenna group differs between the antenna group patterns, and wherein the use antenna group pattern and the transmission beam angle for each of the at least one use antenna group are determined in the small base station such that an expected throughput is maximized.

* * * * *